(12) United States Patent
Li et al.

(10) Patent No.: US 12,177,893 B2
(45) Date of Patent: Dec. 24, 2024

(54) COMMUNICATION METHOD, ACCESS POINT, AND STATION FOR BANDWIDTH UTILIZATION

(71) Applicant: HUAWEI TECHNOLOGIES CO., LTD., Shenzhen (CN)

(72) Inventors: Yanchun Li, Wuhan (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/312,432

(22) Filed: May 4, 2023

(65) Prior Publication Data

US 2023/0276489 A1      Aug. 31, 2023

Related U.S. Application Data

(63) Continuation of application No. 17/393,039, filed on Aug. 3, 2021, now Pat. No. 11,683,832, which is a
(Continued)

(30) Foreign Application Priority Data

Feb. 15, 2016 (CN) .......................... 201610086063.2
Jun. 22, 2016 (CN) .......................... 201610457677.7

(51) Int. Cl.
*H04W 74/00*     (2009.01)
*H04L 5/00*      (2006.01)
(Continued)

(52) U.S. Cl.
CPC ......... *H04W 74/002* (2013.01); *H04L 5/0055* (2013.01); *H04W 28/20* (2013.01);
(Continued)

(58) Field of Classification Search
CPC . H04W 48/08; H04W 28/20; H04W 72/0446; H04W 72/20; H04W 92/20;
(Continued)

(56) References Cited

U.S. PATENT DOCUMENTS 7,499,425 B2 *   3/2009   Yew ................... H04W 72/543
                                                         370/329
9,178,673 B1    11/2015   Loc et al.
(Continued)

FOREIGN PATENT DOCUMENTS

CN          101656644 A       2/2010
CN          102422690 A       4/2012
(Continued)

OTHER PUBLICATIONS

U.S. Appl. No. 17/393,039, filed Aug. 3, 2021.
(Continued)

*Primary Examiner* — Jenee Holland
(74) *Attorney, Agent, or Firm* — Leydig, Voit & Mayer, Ltd.

(57) ABSTRACT

A communication method, an access point and a station are provided. The method includes: receiving, by an access point, a sending request sent by a first station, and sending clear to send information to the first station; when the access point receives feedback information sent by the first station, allocating, by the access point, a channel to the first station, and allocating a channel to a second station based on remaining bandwidth; generating a first trigger frame, and sending the first trigger frame to the first station and the second station; and receiving uplink data sent by the first station and the second station. According to the application, bandwidth utilization of the access point and data transmission efficiency can be improved.

15 Claims, 15 Drawing Sheets

Related U.S. Application Data continuation of application No. 16/103,470, filed on Aug. 14, 2018, now Pat. No. 11,116,003, which is a continuation of application No. PCT/CN2016/111455, filed on Dec. 22, 2016.

(51) Int. Cl.
| | |
|---|---|
| *H04W 28/20* | (2009.01) |
| *H04W 72/044* | (2023.01) |
| *H04W 72/0446* | (2023.01) |
| *H04W 72/0453* | (2023.01) |
| *H04W 72/20* | (2023.01) |
| *H04W 74/0808* | (2024.01) |
| *H04W 74/0816* | (2024.01) |
| *H04W 74/0833* | (2024.01) |
| *H04W 92/20* | (2009.01) |

(52) U.S. Cl.
CPC ....... *H04W 72/0446* (2013.01); *H04W 72/20* (2023.01); *H04W 74/0808* (2013.01); *H04W 74/0816* (2013.01); *H04W 92/20* (2013.01)

(58) Field of Classification Search
CPC ........... H04W 74/004; H04W 74/0808; H04W 74/0816; H04W 74/0833; H04L 5/0055
See application file for complete search history.

(56) References Cited

U.S. PATENT DOCUMENTS

| | | |
|---|---|---|
| 9,949,290 B2 | 4/2018 | Seok |
| 2002/0080768 A1 | 6/2002 | Garcia-Luna-Aceves et al. |
| 2003/0033394 A1 | 2/2003 | Stine |
| 2005/0213601 A1 | 9/2005 | Ginzburg et al. |
| 2006/0146869 A1 | 7/2006 | Zhang et al. |
| 2007/0177495 A1 | 8/2007 | Ametsitsi |
| 2009/0303974 A1* | 12/2009 | Chi ........................ H04W 48/06 455/435.2 |
| 2010/0046485 A1 | 2/2010 | Merlin et al. |
| 2010/0054230 A1 | 3/2010 | Sridhara et al. |
| 2011/0075613 A1* | 3/2011 | Yuan ................. H04W 72/1215 370/329 |
| 2011/0086608 A1 | 4/2011 | Yamagishi et al. |
| 2011/0150004 A1 | 6/2011 | Denteneer et al. |
| 2012/0002634 A1 | 1/2012 | Seok |
| 2012/0099568 A1 | 4/2012 | Wentink |
| 2012/0099664 A1* | 4/2012 | Cheong ............... H04W 74/085 375/259 |
| 2012/0182926 A1 | 7/2012 | Yu et al. |
| 2012/0207036 A1* | 8/2012 | Ong ...................... H04W 72/04 370/252 |
| 2012/0213177 A1* | 8/2012 | Lee ..................... H04W 52/262 370/329 |
| 2012/0243485 A1* | 9/2012 | Merlin .................. H04W 28/20 370/329 |
| 2012/0278400 A1* | 11/2012 | Elson .................... H04L 47/722 709/206 |
| 2012/0315938 A1 | 12/2012 | Van Nee Didier et al. |
| 2012/0327870 A1* | 12/2012 | Grandhi ................ H04W 74/04 370/329 |
| 2013/0044877 A1* | 2/2013 | Liu ..................... H04L 27/2613 370/328 |
| 2013/0155976 A1 | 6/2013 | Chen et al. |
| 2013/0163576 A1 | 6/2013 | Wang et al. |
| 2013/0195018 A1 | 8/2013 | Lv et al. |
| 2013/0229996 A1* | 9/2013 | Wang .................... H04W 74/006 370/329 |
| 2013/0336196 A1 | 12/2013 | Abraham et al. |
| 2014/0003336 A1* | 1/2014 | Padden .................. H04L 67/61 370/328 |
| 2014/0010145 A1* | 1/2014 | Liu ..................... H04W 72/121 370/312 |
| 2014/0016531 A1 | 1/2014 | Yun et al. |
| 2014/0169356 A1* | 6/2014 | Noh ...................... H04W 28/20 370/338 |
| 2014/0314056 A1* | 10/2014 | Park ....................... H04W 72/04 370/336 |
| 2014/0334387 A1* | 11/2014 | Doppler ............ H04W 74/0816 370/329 |
| 2014/0335877 A1* | 11/2014 | Roberts ................. H04W 72/52 455/560 |
| 2015/0063318 A1 | 3/2015 | Merlin et al. |
| 2015/0131568 A1 | 5/2015 | You |
| 2015/0139201 A1 | 5/2015 | Ko et al. |
| 2015/0172012 A1* | 6/2015 | Abeysekera .......... H04L 5/0032 370/329 |
| 2015/0201401 A1 | 7/2015 | Lahetkangas et al. |
| 2015/0230170 A1 | 8/2015 | Jeong et al. |
| 2015/0264689 A1* | 9/2015 | Sampath ........... H04W 74/0816 370/329 |
| 2015/0289242 A1* | 10/2015 | Cheong ................ H04W 74/006 370/338 |
| 2015/0373587 A1* | 12/2015 | Josiam .................. H04W 28/20 370/338 |
| 2015/0382374 A1 | 12/2015 | Bhorkar et al. |
| 2016/0014725 A1* | 1/2016 | Yu ..................... H04W 72/0453 370/329 |
| 2016/0029248 A1* | 1/2016 | Syed ..................... H04W 72/52 370/235 |
| 2016/0029357 A1* | 1/2016 | Lv ......................... H04L 47/125 370/235 |
| 2016/0037531 A1 | 2/2016 | Lu et al. |
| 2016/0080122 A1 | 3/2016 | Oh et al. |
| 2016/0088602 A1 | 3/2016 | Seok |
| 2016/0113009 A1 | 4/2016 | Seok |
| 2016/0242070 A1 | 8/2016 | Asterjadhi et al. |
| 2016/0316458 A1* | 10/2016 | Kwon .................... H04W 72/23 |
| 2017/0055284 A1* | 2/2017 | Min .................... H04L 41/0896 |
| 2017/0127451 A1 | 5/2017 | Chun et al. |
| 2017/0245261 A1 | 8/2017 | Cariou et al. |
| 2017/0264416 A1* | 9/2017 | Wilhelmsson ........ H04W 72/23 |
| 2017/0279568 A1 | 9/2017 | Huang et al. |
| 2017/0303292 A1 | 10/2017 | Ahn et al. |
| 2018/0014334 A1 | 1/2018 | Ahn et al. |
| 2018/0020475 A1 | 1/2018 | Kim et al. |
| 2018/0027591 A1 | 1/2018 | Shinohara et al. |
| 2018/0206233 A1* | 7/2018 | Huang .................. H04L 5/0037 |
| 2020/0245352 A1* | 7/2020 | Seok .................... H04W 52/367 |
| 2023/0188183 A1* | 6/2023 | Sethi .................... H04B 7/0452 370/329 |

FOREIGN PATENT DOCUMENTS

| | | |
|---|---|---|
| CN | 102812649 A | 12/2012 |
| CN | 105281864 A | 1/2016 |
| JP | 2010045784 A | 2/2010 |
| KR | 20100105308 A | 9/2010 |
| RU | 2574137 C2 | 2/2016 |

OTHER PUBLICATIONS

U.S. Appl. No. 16/103,470, filed Aug. 14, 2018.
Simone Merlin (Qualcomm), "Trigger Frame Content; 11-15-1344-01-00ax-trigger-frame-content," vol. 802.11ax, No. 1, Nov. 11, 2015, pp. 1-19, XP068099320.
Matthew Gast, "802.11ac: A Survival Guide", Dec. 28, 2013, 10 pages, XP055354479.
Young Hoon Kwon (Newracom), "Protection using MU RTS/CTS; 11-16-0048-00-00ax-protection-using-mu-rts-cts", vol. 802.11ax, Jan. 18, 2016, pp. 1-11, XP068104803.
Young Hoon Kwon (Newracom), "Bandwidth for UL MU transmission; 11-15-1052-00-00ax-bandwidth-for-ul-mu-transmission", vol. 802.11ax, Sep. 13, 2015, pp. 1-13, XP068098242.

* cited by examiner

COMMUNICATION METHOD, ACCESS POINT, AND STATION FOR BANDWIDTH UTILIZATION

CROSS-REFERENCE TO RELATED APPLICATIONS

This application is a continuation of U.S. patent application Ser. No. 17/393,039, filed on Aug. 3, 2021, which is a continuation of U.S. patent application Ser. No. 16/103,470, filed on Aug. 14, 2018, now U.S. Pat. No. 11,116,003, which is a continuation of International Application No. PCT/CN2016/111455, filed on Dec. 22, 2016, which claims priority to Chinese Patent Application No. 201610457677.7, filed on Jun. 22, 2016, and priority to Chinese Patent Application No. 201610086063.2, filed on Feb. 15, 2016. All of the afore-mentioned patent applications are hereby incorporated by reference in their entireties.

TECHNICAL FIELD

Embodiments of the present application relate to the communications field, and in particular, to a communication method, an access point, and a station.

BACKGROUND

In network communication on an unlicensed frequency band, a communications system provides a request to send (RTS)/clear to send (CTS) mechanism. After an access point (AP) establishes a transmission opportunity (TXOP) for a service access category (AC), the AP may transmit data of the AC by using the TXOP. In a transmission opportunity establishment process, a station (STA) obtains a network allocation vector (NAV). The NAV is used to specify a time during which a channel is occupied. When the NAV of the station is not zero, it indicates that the channel of the station is in a busy state. When the NAV of the station is zero, it indicates that the channel of the station is in an idle state.

In a process in which the access point establishes communication with the station, after the station sends an RTS that carries a bandwidth parameter, if available bandwidth of the access point is less than or equal to the bandwidth parameter carried in the RTS, the access point and the station may establish a TXOP by using the available bandwidth and perform data transmission; or if available bandwidth of the access point is greater than the bandwidth parameter carried in the RTS, a first station and a second station may perform data transmission by using bandwidth corresponding to the bandwidth parameter carried in the RTS.

However, when a station processes a service, the AP is occupied by the station, and available bandwidth of the AP is usually greater than bandwidth used by the station to implement a service. Therefore, the bandwidth of the AP is not fully used, and waste is caused.

SUMMARY

This application provides a communication method, an access point, and a station, so as to improve bandwidth utilization of the access point and improve data transmission efficiency.

A first aspect of this application provides a communication method, including: broadcasting, by an access point, a sending request; receiving, by the access point, a clear to send information from a first station in respond to the sending request; sending, by the access point, a trigger information to the first station and a second station; wherein based on the receipt of the clear to send information from the first station, the access point confirms that the sending request transmission is successful, which permitting the access point to send the trigger information.

A second aspect of this application provides a communication method, comprising: receiving, by a station, a sending request broadcasted by an access point; sending, by the station, a clear to send information in respond to the sending request; receiving, by the station, a trigger information to multiple stations, wherein the multiple station includes the station; wherein based on the receipt of the clear to send information from the station, the access point confirms that the sending request transmission is successful, which permitting the access point to send the trigger information.

Other aspects provide apparatus, such as chips or access points, stations; or, computer readable mediums, software products which can execute the methods mentioned above.

In the technical solutions according to this application, when the available bandwidth of the access point is greater than the bandwidth used by the station to implement a service, the access point may allocate the channel to the another station based on the remaining bandwidth, and perform data transmission. Therefore, bandwidth utilization is improved. For a communications system, more data may be transmitted within a given time. Therefore, data transmission efficiency of the communications system is improved.

BRIEF DESCRIPTION OF DRAWINGS

FIG. 3-1 is a schematic signaling flowchart of a communication method according to the present disclosure;

FIG. 3-2 is another schematic signaling flowchart of a communication method according to the present disclosure;

FIG. 3-3 is another schematic flowchart of a communication method according to the present disclosure;

FIG. 3-4 is another schematic signaling flowchart of a communication method according to the present disclosure;

FIG. 3-5 is another schematic flowchart of a communication method according to the present disclosure;

FIG. 3-6 is another schematic diagram of a communication method according to the present disclosure;

FIG. 4-1 is another schematic signaling flowchart of a communication method according to the present disclosure;

FIG. 4-2 is another schematic signaling flowchart of a communication method according to the present disclosure;

FIG. 5-1 is another schematic signaling flowchart of a communication method according to the present disclosure;

FIG. 5-2 is another schematic diagram of a communication method according to the present disclosure;

FIG. 6-1 is another schematic signaling flowchart of a communication method according to the present disclosure;

FIG. 6-2 is another schematic diagram of a communication method according to the present disclosure;

FIG. 9-1 is a schematic diagram of an access point according to the present disclosure;

FIG. 9-2 is another schematic diagram of an access point according to the present disclosure;

FIG. 9-3 is another schematic diagram of an access point according to the present disclosure;

FIG. 10-1 is another schematic diagram of a station according to the present disclosure;

FIG. 10-2 is another schematic diagram of a station according to the present disclosure;

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons skilled in the art based on the embodiments of the present disclosure without creative efforts shall fall within the protection scope of the present disclosure.

Figure 1:
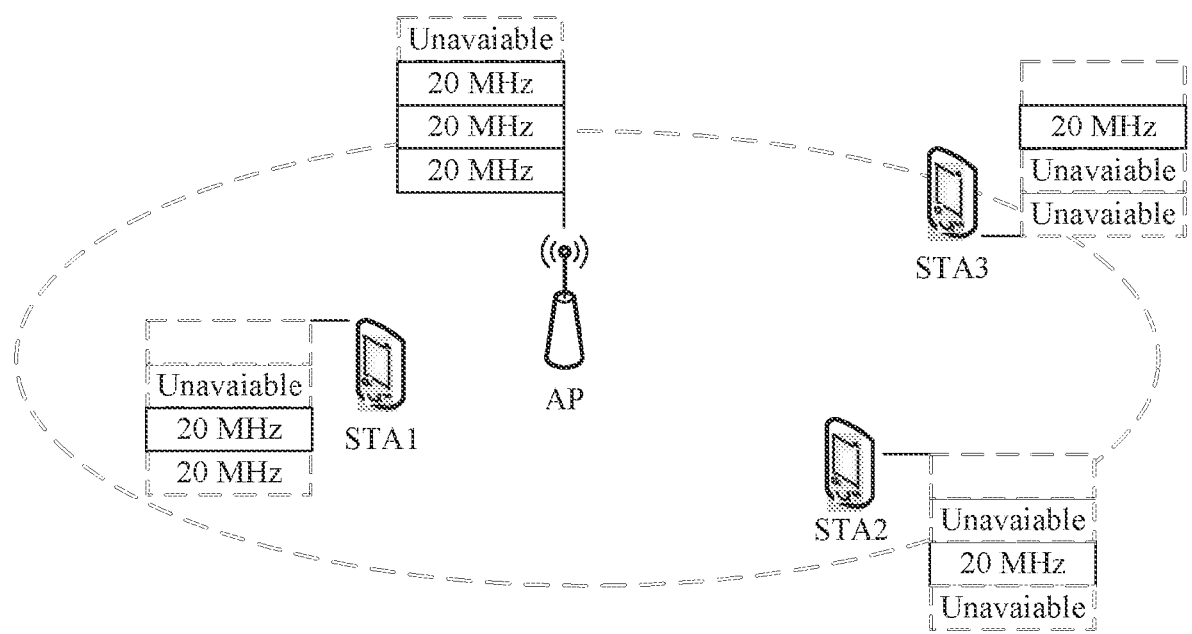
FIG. 1 is a schematic diagram of a communications system according to this application.

For ease of understanding, the following describes network nodes in a communications system applied to this application, referring to FIG. 1.

In a wireless network, network nodes include an access point and a station. The access point provides a data service for a station in a coverage area of the access point, and the access point and the station served by the access point form a basic service set (BSS). Generally, the BSS includes several stations.

Figure 2:
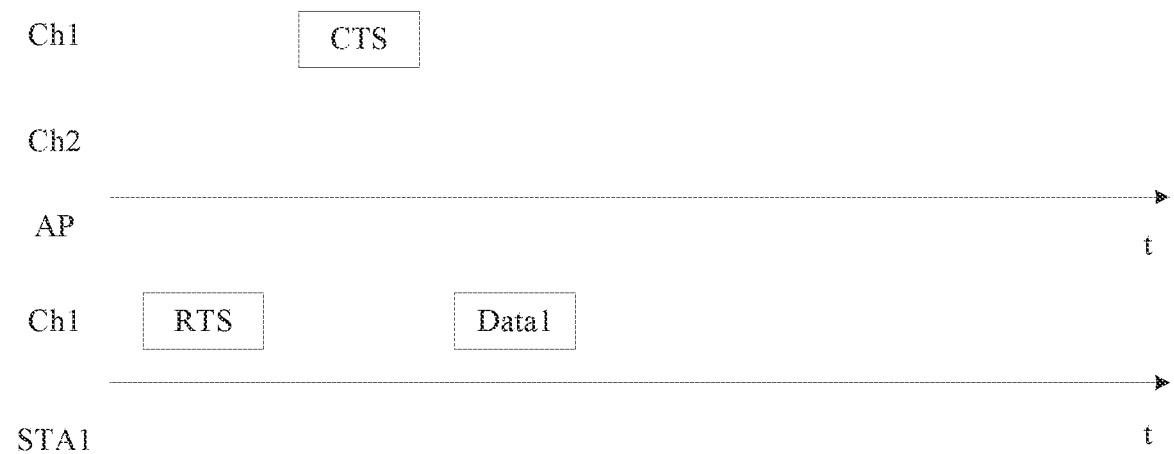
FIG. 2 is a schematic flowchart of a communication method according to the prior art.

When a STA sends a service request to an AP, the AP may establish a TXOP for an AC, and transmit data of the AC by using the TXOP. When available bandwidth of the AP includes Ch1 and Ch2, and bandwidth required by a STA1 is Ch1, as shown in FIG. 2, the access point communicates with the STA by using Ch1. It can be learned that the AP reserves a channel for only a single STA, and Ch2 is not used. Therefore, in an existing communication method, bandwidth of an AP is not fully used, and bandwidth waste is caused.

This application provides a transmission mechanism under a condition that available channels of transmit and receive nodes are asymmetric. A core idea of the transmission mechanism is to allocate available bandwidth of an access point to a plurality of stations, so as to improve bandwidth utilization, and improve data transmission efficiency of a communications system.

When the available bandwidth of the access point not only meets bandwidth requested by a station, but also includes remaining bandwidth, the following describes a communication process in which the available bandwidth of the access point is allocated to the plurality of stations.

Figures 1, 3:
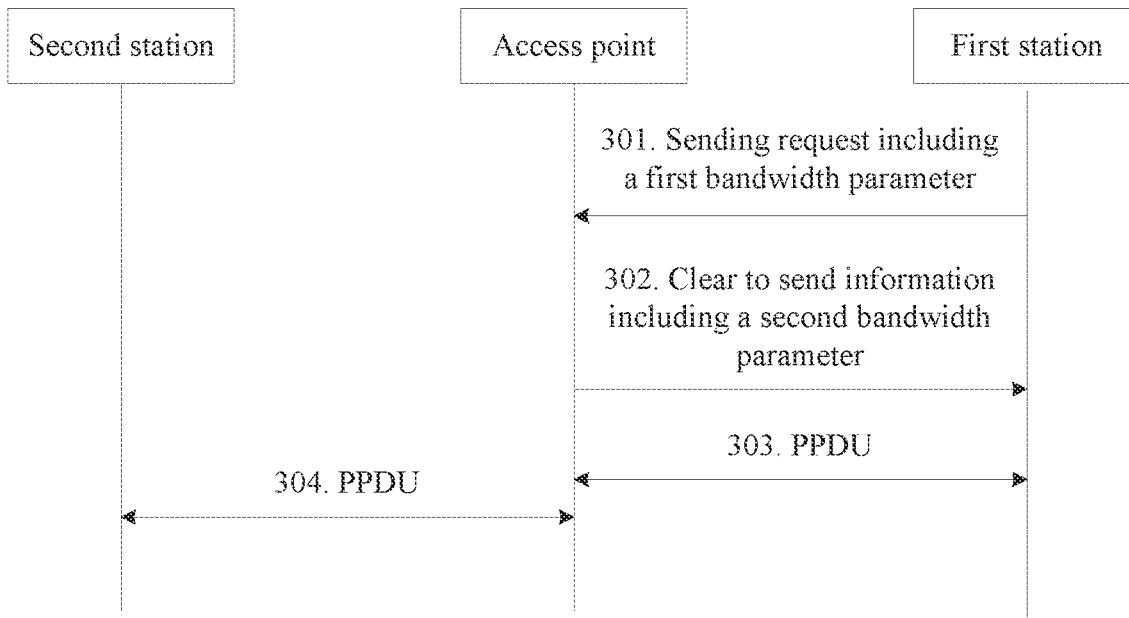
Figures 2, 3:
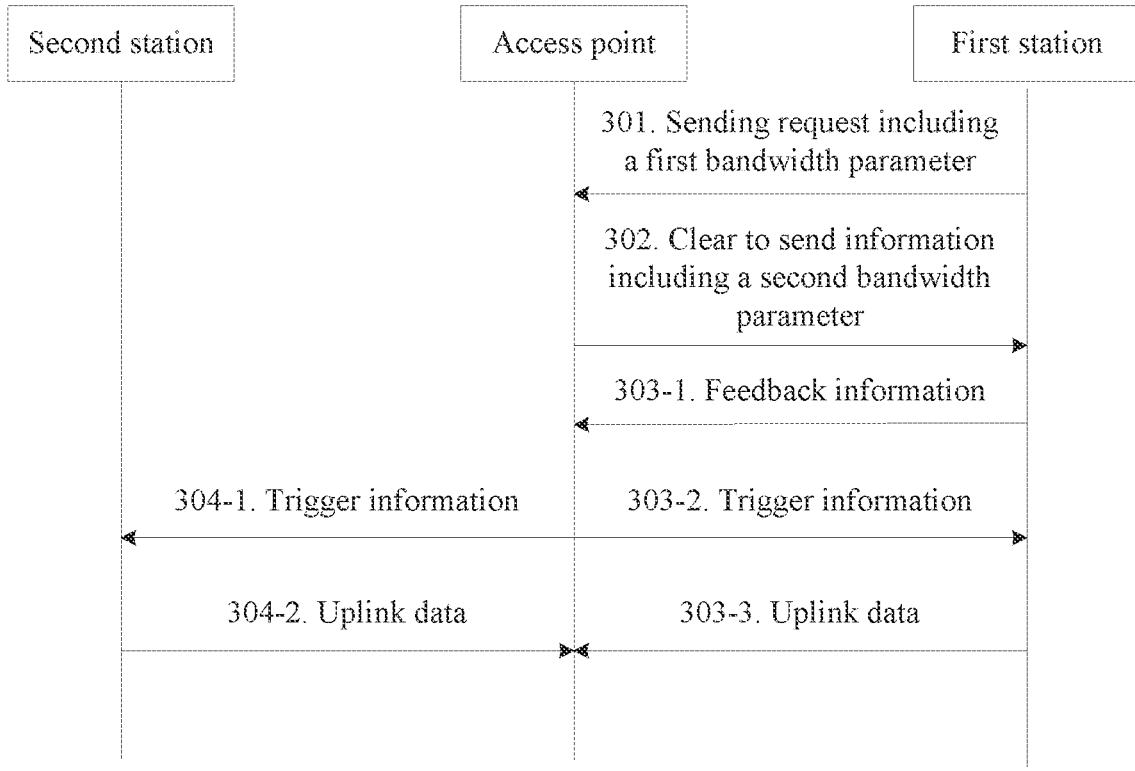
Figure 3:
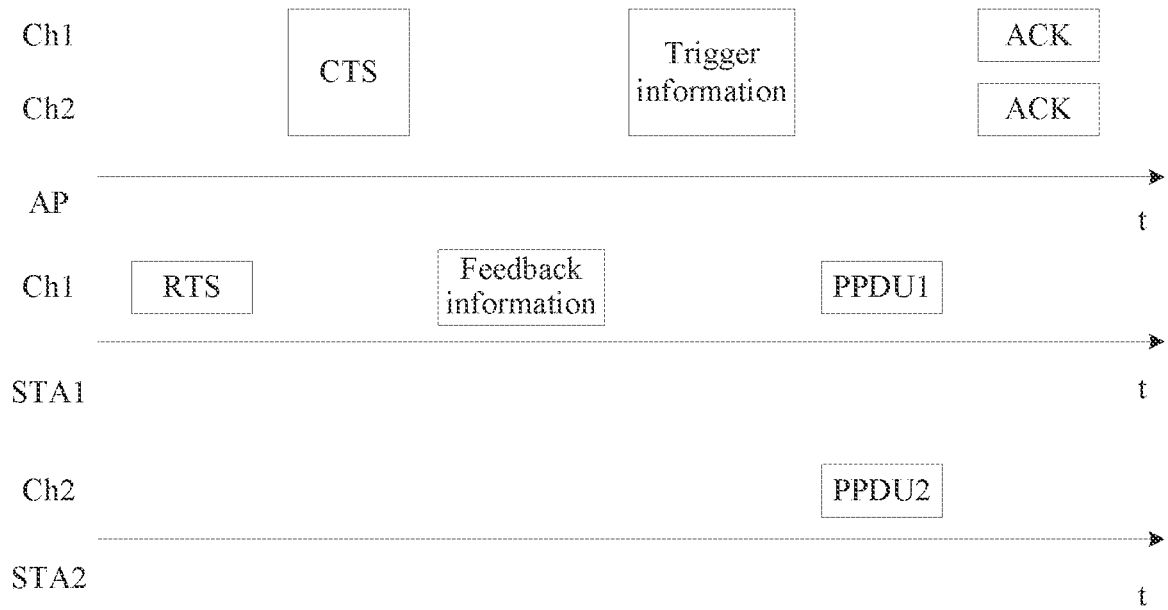

Referring to FIG. 3-1, an embodiment of a communication method according to this application includes the following steps.

301. An access point receives a sending request sent by a first station, where the sending request includes a first bandwidth parameter, and the first bandwidth parameter is corresponding to bandwidth required by the first station.

In this embodiment, the sending request is used to request a channel set corresponding to the first bandwidth parameter, and may be an RTS frame. The first station sends the sending request in a manner that includes but is not limited to a non-HT mode, a non-HT repetition mode, or an HE mode, and the sending request may be sent for one or more times. This is not limited herein. The non-HT repetition mode means that the non-HT mode is repeatedly used in frequency domain. The HE mode is an OFDMA mode. It can be understood that the non-HT mode is different from that defined in the 802.11n standard. The first bandwidth parameter may be represented by CH_BANDWIDTH_IN_NON_HT or CH_BANDWIDTH. When the sending request is an RTS frame, the first bandwidth parameter is a bandwidth included in an RX vector.

The bandwidth indicated by the first bandwidth parameter does not exceed bandwidth of an idle channel sensed by the first station.

302. The access point sends clear to send information to the first station and a second station, where the clear to send information includes a second bandwidth parameter, and the second bandwidth parameter is corresponding to available bandwidth of the access point.

The second bandwidth parameter is not greater than total bandwidth of all idle channels of the access point, and may be the total bandwidth of all the idle channels of the access point or bandwidth of some idle channels of the access point. When the sending request is an RTS frame, the clear to send information is a CTS frame. When the first station receives the CTS frame, it indicates that an RTS/CTS frame interaction succeeds, and step 303 is performed. A CTS frame format may be a DMG CTS format. The CTS frame may include only an RA field, or include both an RA field and a TA field.

During implementation, the second bandwidth parameter may be greater than the first bandwidth parameter, or the second bandwidth parameter may be less than or equal to the first bandwidth parameter.

It should be noted that, when the sending request is an RTS frame, and the clear to send information is a CTS frame, the first station receives a first indication service primitive before the CTS frame expires, and continues to wait for a second indication service primitive. After identifying the CTS frame sent by the access point, the first station may confirm that the RTS/CTS frame interaction succeeds, and then perform step 303. The first indication service primitive is used to indicate that the event of sending the CTS frame starts, for example, a PHY-RXSTART.indication primitive, and the second service primitive is used to indicate that the event of sending the CTS frame ends, for example, a PHY-RXEND.indication primitive.

303. The access point receives uplink transmission data sent by the first station.

The access point allocates a channel to the first station, and the access point and the first station may transmit a physical layer protocol data unit (PPDU) on the channel. The PPDU may be classified into a data packet, a management packet, or a control packet by transport packet type. The control packet may be a CTS frame or an ACK frame.

An uplink transmission bandwidth parameter sent by the first station does not exceed a minimum value or an intersection set of the second bandwidth parameter and the first bandwidth parameter.

304. The access point receives uplink transmission data sent by the second station.

The access point allocates a channel to the second station based on remaining bandwidth, and the access point and the second station may transmit a PPDU on the channel.

An uplink transmission bandwidth parameter sent by the second station does not exceed the second bandwidth parameter.

The uplink transmission in steps 303 and 304 may be uplink transmission triggered by the AP. The AP sends a trigger frame, and adds bandwidth allocation information to the trigger frame. The first station and the second station set a bandwidth parameter of the uplink transmission based on the bandwidth allocation information carried in the received trigger frame sent by the AP.

In step 303, optionally, a protocol may alternatively define that a channel used when the access point and the first station perform communication may be an intersection set of the available bandwidth of the access point and the bandwidth required by the first station.

It can be understood that, if the access point still has remaining bandwidth in addition to bandwidth allocated to the first station and the second station, the access point may further provide access for another station such as a third station or a fourth station by using the remaining bandwidth. When the access point and a plurality of stations perform communication, a channel used by the access point to send a PPDU is a channel set corresponding to the second bandwidth parameter or a subset of the channel set.

To avoid a data conflict, before a network node performs sending on a channel, the network node may determine, according to a protocol stipulation or an instruction of the AP, whether to sense the channel; and if the channel needs to be sensed, sense the channel and determine whether the channel is idle. When the channel is idle, the network node can send data. The communication method further includes: sensing, by the access point, a channel. If it is detected that the channel is idle within a sense time period, a PPDU is sent. Sense duration is point coordination function interframe space (PIFS) or short interframe space (SIFS). It can be understood that a process of sensing a channel by a station is similar to the process of sensing the channel by the access point.

In actual application, different communications protocols are configured for different stations, or stations have different bandwidth negotiation/extension capabilities. According to this application, a channel may be allocated to a station based on a characteristic of the station, so that compatibility with different communications protocols can be achieved. Based on the embodiment shown in FIG. 3-1, before step 301, the communication method further includes: receiving, by the access point, an association request sent by the first station, where the association request includes at least one of a communications protocol version, bandwidth negotiation capability information, or bandwidth extension capability information. Step 302 may be specifically: sending, by the access point, the clear to send information to the first station according to a communications protocol or a station capability.

Optionally, the access point may use, only for a station that supports bandwidth extension, the second bandwidth parameter greater than the first bandwidth parameter. The station reports a protocol version or a bandwidth extension capability before the access point performs step 301. If the protocol version is reported, the bandwidth extension capability of the station may be obtained by determining whether the protocol version supports the bandwidth extension capability.

Specifically, when the association request includes at least one of a predetermined communications protocol version, predetermined bandwidth negotiation capability information, or predetermined bandwidth extension information, the channel set corresponding to the second bandwidth parameter may be all or some idle channels of the access point, or the channel set corresponding to the second bandwidth parameter does not exceed idle channels of the access point, or the channel set corresponding to the second bandwidth parameter does not include a non-idle (busy) channel of the access point. The predetermined communications protocol version may be 802.11ax. The predetermined communications protocol version, the predetermined bandwidth negotiation capability information, or the predetermined bandwidth extension information may be specified by a protocol. In the foregoing step, if the second bandwidth parameter is greater than the first bandwidth parameter, bandwidth extension is implemented, and channel bandwidth utilization is improved.

When the association request does not include any one of a predetermined communications protocol version, predetermined bandwidth negotiation capability information, or predetermined bandwidth extension information, a channel used when the access point and the first station perform communication is specifically as follows.

If the bandwidth required by the first station is in a range of the available bandwidth of the access point, the channel used when the access point and the first station perform communication may be the channel set corresponding to the first bandwidth parameter or a subset of the channel set; if the intersection set of the available bandwidth of the access point and the bandwidth required by the first station is less than both the available bandwidth of the access point and the bandwidth required by the first station, the channel used when the access point and the first station perform communication may be all or some channels in the intersection set; or if the available bandwidth of the access point is in a range of the bandwidth required by the first station, the channel used when the access point and the first station perform communication may be the channel set corresponding to the second bandwidth parameter or a subset of the channel set.

During implementation, optionally, a protocol may define that the channel used when the access point and the first station perform communication is an intersection set of the available bandwidth of the access point and the first bandwidth parameter.

During implementation, optionally, a protocol may define that the sending request or the clear to send information may carry duration information, and that the foregoing bandwidth parameters are limited to be used within duration that is after the first station sends the request or the access point sends the clear to send information.

The available bandwidth of the access point or a station is an intersection set of bandwidth supported by transmit and receive modules of the access point or the station and idle bandwidth.

The following details a process of communication between the access point and the first station, and a process of communication between the access point and the second station. Referring to FIG. 3-2, based on the embodiment shown in FIG. 3-1, another embodiment of a communication method according to this application includes the following steps.

301. An access point receives a sending request sent by a first station, where the sending request includes a first bandwidth parameter, and the first bandwidth parameter is corresponding to bandwidth required by the first station.

302. The access point sends clear to send information to the first station, where the clear to send information includes a second bandwidth parameter.

Step 301 and step 302 are similar to step 301 and step 302 in the embodiment shown in FIG. 3-1, and details are not described herein again.

303-1. The first station sends feedback information to the access point.

After receiving the clear to send information, the first station may send the feedback information to the access point. The feedback information may be a data packet, an ACK frame, a CTS frame, a channel state report frame, a control frame, or a management frame.

303-2. The access point sends trigger information to the first station.

After receiving the feedback information, the access point generates the trigger information, and then sends the trigger information to the first station. The trigger information may include only a trigger frame, or include both a trigger frame and an ACK frame. The trigger information is used to schedule a station by the access point.

303-3. The access point receives uplink data sent by the first station.

After receiving the trigger information, the first station may send the uplink data to the access point based on the trigger information.

304-1. The access point sends the trigger information to a second station.

The trigger information in step 304-1 is consistent with the trigger information in step 303-2. For example, if the trigger information in step 303-2 includes only a trigger frame, the trigger information in step 304-1 may also include only a trigger frame. The access point may synchronously or asynchronously send the trigger information to the first station and the second station. For example, after receiving the feedback information, the access point may first send the trigger information to the first station, and then send the trigger information to the second station.

304-2. The access point receives uplink data sent by the second station.

After receiving the trigger information on a channel set corresponding to remaining bandwidth, the second station sends the uplink data to the access point.

FIG. 3-3 is a schematic diagram of communication corresponding to FIG. 3-2. According to a sequence of performing a communication process, the RTS frame is a first frame, the CTS frame is a second frame, the feedback information is a third frame, and the trigger information is a fourth frame. When sensing a channel, a network node (an access point or a station) may set a time interval between an nth frame and an (n+1)th frame to SIFS or PIFS according to a sense type.

Referring to FIG. 3-6, another embodiment of a communication method according to this application includes: receiving, by an access point, a sending request sent by a first station, where the sending request includes a first bandwidth parameter, and the first bandwidth parameter is corresponding to bandwidth required by the first station; sending, by the access point, first trigger information to the first station, and receiving uplink data sent by the first station, where the first trigger information further includes a second bandwidth parameter, and the second bandwidth parameter is corresponding to available bandwidth of the access point; and sending, by the access point, second trigger information to a second station, and receiving uplink data sent by the second station, where the second trigger information includes the second bandwidth parameter.

Specifically, the first station may send the sending request to the access point on a channel set corresponding to the first bandwidth parameter. The sending request may be data that carries the first bandwidth parameter. The access point may send the trigger information in a downlink OFDMA mode, that is, in a non-HT repetition mode. A channel used for sending the trigger information is in a range of an intersection set of the channel set corresponding to the first bandwidth parameter and a channel set corresponding to the second bandwidth parameter, for example, Ch1. Acknowledgment information (an ACK frame) returned by the access point to the first station can be completely received on the channel set corresponding to the first bandwidth parameter.

The first trigger information may include an ACK frame and a trigger frame, and the second trigger information may include an ACK frame and a trigger frame (as shown in FIG. 3-6), or include only a trigger frame. After receiving the trigger information, the first station and the second station may separately send the uplink data to the access point.

Based on the embodiment shown in FIG. 3-2, optionally, after step 304-1 and before step 304-2, the communication method according to this application further includes: performing, by the access point, cyclic redundancy check (CRC) on the uplink data sent by the second station; if the check succeeds, performing step 304-2; or if the check fails, performing, by the access point, step 304-1, or stopping using the channel set corresponding to the remaining bandwidth.

Based on the embodiment shown in FIG. 3-2, optionally, after step 304-1 and before step 304-2, the communication method according to this application further includes: if a PPDU sent by the second station is not received by the access point within a preset sense time period, performing, by the access point, step 304-1, or stopping using the channel set corresponding to the remaining bandwidth.

Figures 3, 4:
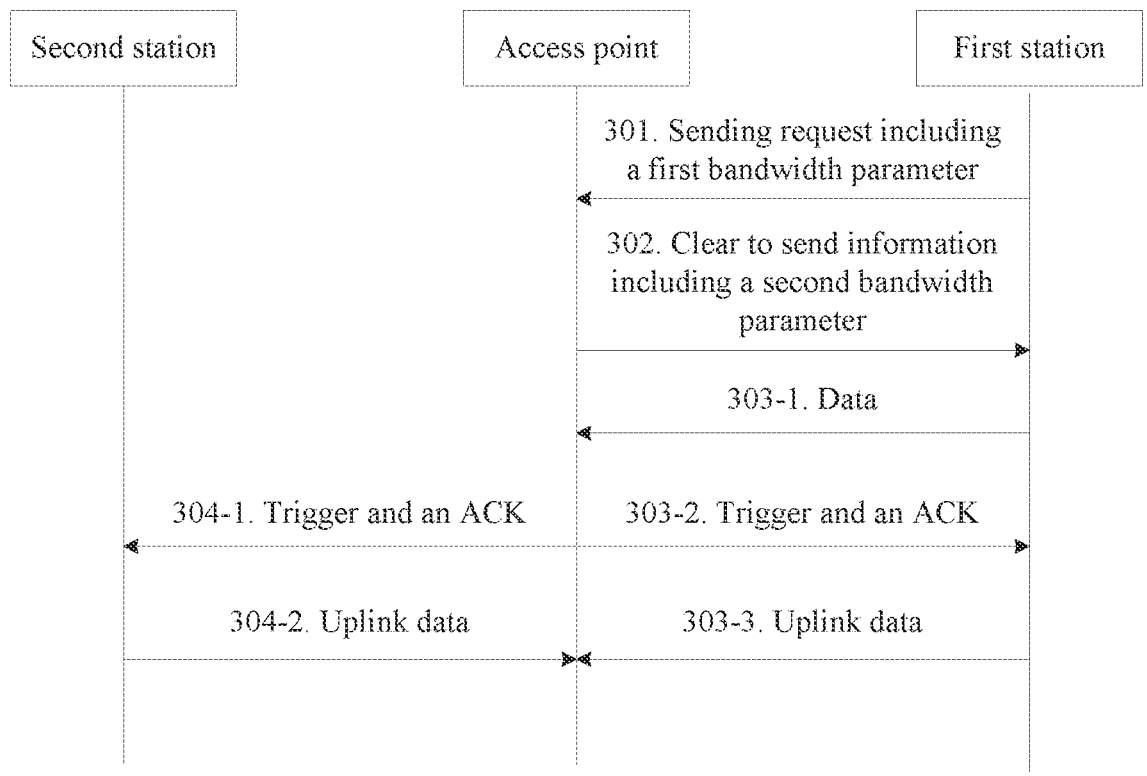

Based on the communication method shown in FIG. 3-2, in an optional embodiment of this application, referring to FIG. 3-4, a communication method according to this application includes the following steps.

301. An access point receives a sending request sent by a first station, where the sending request includes a first bandwidth parameter, and the first bandwidth parameter is corresponding to bandwidth required by the first station.

302. The access point sends clear to send information to the first station, where the clear to send information includes a second bandwidth parameter.

303-1. The first station sends a data packet to the access point.

Step 301 and step 303-1 are similar to step 301 and step 303-1 in the embodiment shown in FIG. 3-2, and details are not described herein again.

303-2. The access point sends trigger information to the first station, where the trigger information includes a trigger frame and an ACK frame.

303-3. The access point receives uplink data sent by the first station.

304-1. The access point sends the trigger information on a channel set corresponding to remaining bandwidth.

304-2. The access point receives uplink data sent by a second station.

This embodiment provides a specific implementation, so that this solution is implementable.

Figures 3, 4, 5:
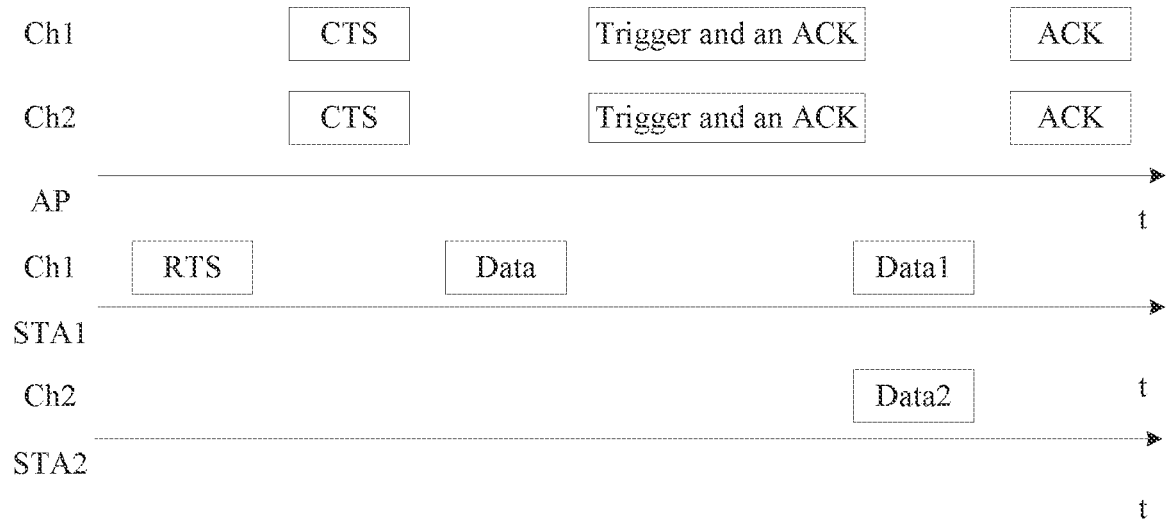

For ease of understanding, the following details the communication method according to this application by using a specific application scenario, referring to FIG. 3-5.

In the specific application scenario according to this application, a BSS includes an AP, a STA1, and a STA2, the sending request is an RTS frame, the first bandwidth parameter is BW1, a frequency band corresponding to BW1 is Ch1, the clear to send information is a CTS frame, the second bandwidth parameter is BW2, and a frequency band corresponding to BW2 is a set including Ch1 and Ch2.

The STA1 broadcasts the RTS frame on Ch1. Ch1 is assumed to be a frequency band ranging from 2400 MHz to 2420 MHz, and BW1 is 20 MHz. The AP sends the CTS frame to the STA1 after receiving the RTS frame, and the STA1 receives the CTS frame on Ch1, determines that an RTS/CTS frame interaction is complete, and then sends data to the AP on Ch1. The AP generates a trigger frame and an ACK frame, sends the trigger frame and the ACK frame on Ch1 and Ch2, and triggers the station STA1 on Ch1 and the station STA2 on Ch2 to send uplink data to the AP. After data transmission is complete, the AP1 may send the ACK frame to the STA1 and the STA2, to indicate that transmission is complete.

Referring to FIG. 4-1, another embodiment of a communication method according to this application includes the following steps.

401. A first station broadcasts a sending request, where the sending request includes a first bandwidth parameter.

In this embodiment, the first bandwidth parameter is corresponding to bandwidth required by the first station, and the bandwidth required by the first station may be available bandwidth or preferred bandwidth of the first station. Specifically, the bandwidth in this application may be a spectral width in a unit of Hz, or a set of channels. When the first station needs to implement a service, the first station broadcasts the sending request, and the access point may receive the sending request sent by the first station, and perform step 402 in response to the sending request.

The sending request further includes a time for which the first station occupies the frequency band (an NAV). For another station, the sending request is used to set the NAV. The sending request may be an RTS frame.

402. An access point sends clear to send information to the first station, where the clear to send information includes a second bandwidth parameter.

The second bandwidth parameter is corresponding to available bandwidth of the access point. When the access point sends the clear to send information to the first station, the first station may receive the clear to send information sent by the access point. The clear to send information may be a CTS frame.

It should be noted that, the available bandwidth of the access point may be all available bandwidths of the access point, or an available bandwidth mode in an available bandwidth mode set, for example, a maximum available bandwidth mode formed by available channels of the access point. The access point may further add a control transfer bit to the clear to send information. The bit may indicate two states: control transfer required and no control transfer required.

403. The first station determines whether the clear to send information meets a feedback condition; and if the clear to send information meets the feedback condition, performs step 404; or if the clear to send information does not meet the feedback condition, performs step 411.

After receiving the clear to send information, the first station determines whether the clear to send information meets the feedback condition. The first station may specifically use one or a combination of the following manners to determine whether the clear to send information meets the feedback condition.

1. The first station determines whether the first bandwidth parameter is less than the second bandwidth parameter, and if the first bandwidth parameter is less than the second bandwidth parameter, determines that the clear to send information meets the feedback condition.

2. The first station determines whether a first channel set is a proper subset of a second channel set, and if yes, determines that the clear to send information meets the feedback condition, where the first channel set is corresponding to the first bandwidth parameter, and the second channel set is corresponding to the second bandwidth parameter.

For example, the first channel set includes Ch1 and Ch2, and the second channel set includes Ch1, Ch2, and Ch3, indicating that Ch1 and Ch2 can be used by the first station. Therefore, the first station may determine that the clear to send information meets the feedback condition.

3. The first station determines whether a first channel set and a second channel set include a same channel, and if yes, determines that the clear to send information meets the feedback condition.

For example, the first channel set includes Ch1 and Ch2, and the second channel set includes Ch1 and Ch3, indicating that Ch1 can be used by the first station. Therefore, the first station may determine that the clear to send information meets the feedback condition.

4. When the clear to send information in step 402 carries a control transfer identifier, step 403 may alternatively be implemented in the following manner: The first station may determine whether the clear to send information carries a control transfer identifier, and if yes, determine that the clear to send information meets the feedback condition.

Specifically, when determining that the first bandwidth parameter is less than the second bandwidth parameter, the access point may send, to the first station, the clear to send information that carries the control transfer identifier, indicating that the access point is to allocate some available channels to the first station for use. After receiving the clear to send information, the first station determines whether the clear to send information carries the control transfer identifier; and if yes, determines that the clear to send information meets the feedback condition and performs step 404. For example, the control transfer identifier may be a non-data response indication bit in a CTS frame. When the non-data response indication bit is 1, it indicates that the clear to send information meets the feedback condition.

It can be understood that the first station may use one or more determining manners to determine whether the clear to send information meets the feedback condition. If none of the foregoing conditions is met, the first station may determine that the clear to send information does not meet the feedback condition, and perform step 411.

404. The first station broadcasts feedback information.

If the clear to send information meets the feedback condition, the first station broadcasts the feedback information, and the access point may sense the feedback information broadcast by the first station. The feedback information is an ACK frame, a CTS frame, or a channel state report frame. The channel report frame includes a channel quality indicator (CQI), channel state information (CSI), or interference information. Further, information included in the channel report frame may be given based on a status of each channel.

For another station, the feedback information may be further used to reconfirm the sending request sent by the first station in step 401. The sending request is assumed to be an RTS frame. The other station can confirm the NAV only after receiving a PHY-RXSTART.indication primitive (event) within a 2 (aSIFSTime)+CTS_Time+aRxPHYStartDelay+2 (aSlotTime) time that is after a PHY-RXEND.indication primitive (event) corresponding to the RTS frame is received. Otherwise, the setting of the NAV in step 401 is canceled (or reset).

405. When the access point receives the feedback information sent by the first station, the access point allocates a channel to the first station, and allocates a channel to a second station based on remaining bandwidth, where the remaining bandwidth is bandwidth in available bandwidth of the access point except bandwidth required by the first station.

The channel allocated to the second station is all or some channels in a channel set corresponding to the remaining bandwidth. This is not limited herein.

Specifically, the access point may allocate the channel to the first station in the following manners.

1. The access point allocates all or some channels in the channel set corresponding to the first bandwidth parameter to the first station.

2. When the clear to send information includes the control transfer identifier, the access point allocates some channels in the channel set corresponding to the second bandwidth parameter to the first station.

Specifically, the access point may allocate the channel to the second station based on the remaining bandwidth parameter in the following manners.

1. The access point randomly selects a channel from the channel set corresponding to the remaining bandwidth, and allocates the channel to the second station.

2. The access point selects, based on a random access request sent by the second station, a channel from the channel set corresponding to the remaining bandwidth, and allocates the channel to the second station.

3. The access point selects, based on upload requirement information sent by the second station, a channel from the channel set corresponding to the remaining bandwidth, and allocates the channel to the second station. The upload requirement information may be a buffer size report of the second station.

406. The access point generates a first trigger frame.

The first trigger frame carries resource allocation indication information used to allocate a channel. The channel may be one or more of a frequency, a time, and a spatial flow used in multi-antenna spatial multiplexing.

407. The access point sends the first trigger frame to the first station.

408. The first station sends uplink data to the access point based on the first trigger frame.

After receiving the first trigger frame sent by the access point, the first station sends the uplink data to the access point based on the first trigger frame, and the access point may receive the uplink data sent by the first station.

409. The access point sends the first trigger frame to the second station.

Step 409 and step 407 may be performed in a same step.

410. The second station sends uplink data to the access point based on the first trigger frame.

After receiving the first trigger frame sent by the access point, the second station sends the uplink data to the access point based on the first trigger frame, and the access point may receive the uplink data sent by the second station. Step 410 and step 408 may be performed in a same step.

411. The first station sends uplink data to the access point based on the second bandwidth parameter.

If the clear to send information does not meet the feedback condition, the first station sends the uplink data to the access point based on the second bandwidth parameter after receiving the clear to send information, and the access point may receive the uplink data. In this case, bandwidth used for data transmission is all or some of channels corresponding to the available bandwidth of the access point.

Optionally, after step 401, the communication method according to this application further includes: determining, by the access point, whether the bandwidth required by the first station includes an available channel set that includes a control channel; and if yes, performing step 402; or if no, prohibiting sending the clear to send information.

The available channel set may be a primary channel or a combination of a primary channel and a secondary channel. If the control channel is a primary channel, the control channel may be used to transmit control signaling and data. In the channel set indicated by the first bandwidth parameter, when the access point has the available channel set, it indicates that the access point may establish a communications connection to the first station on an available channel; or when the access point does not have the available channel set, it indicates that the access point cannot establish a communications connection to the first station within the bandwidth. The access point may reject the sending request and prohibit sending the clear to send information to the first station, and perform another procedure which is not limited herein.

After a station and the access point complete data transmission, an occupied channel needs to be released. Based on the embodiment shown in FIG. 4-1, this application further provides a channel releasing method. In an optional embodiment, after the first station and the access point complete data transmission, the method further includes: sending, by the access point, a second trigger frame to the first station, where the second trigger frame is used to instruct the first station to release the channel.

Specifically, the second trigger frame carries indication information used to instruct the station to release the channel. After receiving the second trigger frame sent by the access point, the first station may release the channel based on the second trigger frame, and broadcast a resource release indication, where the resource release indication is used to instruct an adjacent node of the first station to reset an NAV. The access point may continue to communicate with another station that has not completed data transmission yet. Generally, resetting the NAV means setting the NAV to 0. The resource release indication indicates that a channel occupied by the first station has been released and the channel is idle. The resource release indication may be a CF-END frame.

It can be understood that an object of sending the second trigger frame is not limited to the first station, and may also be another station that completes data transmission with the access point. When receiving the resource release indication, the adjacent station of the first station resets the NAV based on the resource release indication, and may communicate with the access point by using the released channel. If the first station also belongs to a BSS corresponding to another access point, the another access point may receive the resource release indication, reset the NAV according to the resource release indication, and reserve the released channel, so as to establish communication with a station that is in a coverage area of the another access point. It should be noted that when a plurality of stations simultaneously broadcast the resource release indication, a same scrambling code sequence needs to be used. The scrambling code sequence may be specified by an access point or defined by a protocol.

Further, before the access point sends the second trigger frame to the first station, the method further includes: determining, by the access point, whether a station that sends the resource release indication matches a station that occupies a channel; and if yes, performing the step that the access point sends a second trigger frame to the first station; or if no, performing another procedure.

Specifically, after receiving the resource release indication, the access point may obtain information about the station that sends the resource release indication, and if an address identifier of the resource release indication is the same as a station identifier of the station that occupies the channel, determine that the sending station is the station that occupies the channel, and perform the step that the access point sends a second trigger frame to the first station. If an address identifier of the resource release indication is different from a station identifier of the station that occupies the channel, it indicates that the station that sends the resource release indication is not the station that occupies the channel, and there is no need to send a second scheduling resource indication to the station that occupies the channel.

It should be noted that, if an address identifier of the resource release indication includes a group identifier, and the group identifier is not 0, the access point compares a portion of the address identifier except the group identifier with a portion of the station identifier except a group identifier; and if the two portions are the same, performs the step that the access point sends a second trigger frame to the first station; or if the two portions are different, performs another procedure.

For ease of understanding, the following details the communication method according to this application by using a specific application scenario.

Figure 7:
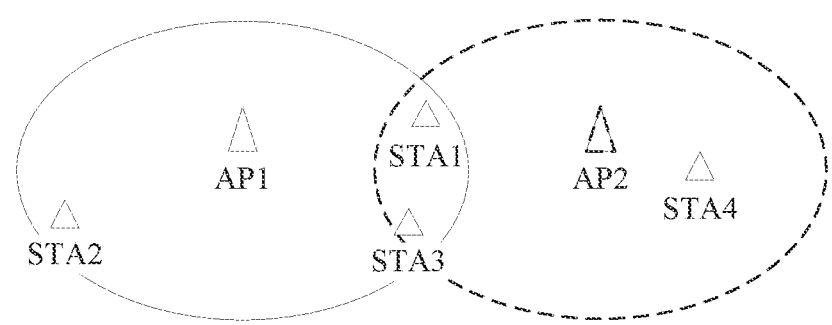
FIG. 7 is another schematic diagram of a communications system according to the present disclosure.

In the specific application scenario according to this application, a BSS1 includes an AP1, a STA1, a STA2, and a STA3, and a BSS2 includes an AP2, the STA1, the STA3, and a STA4, as shown in FIG. 7; and the sending request is an RTS frame, the first bandwidth parameter is BW1, a frequency band corresponding to BW1 is Ch1, the clear to send information is a CTS frame, the second bandwidth parameter is BW2, a frequency band corresponding to BW2 is a set including Ch1 and Ch2, and the feedback information is an ACK frame.

The STA1 broadcasts the RTS frame on Ch1. Ch1 is assumed to be a frequency band ranging from 2400 MHz to 2420 MHz, BW1 is 20 MHz, and an NAV carried in the RTS frame is 60 ms. The STA2, the STA3, and the AP2 may receive the RTS frame, set the NAV to 60 ms, and start countdown.

The AP1 sends the CTS frame on Ch1 and Ch2. A channel set including Ch1 and Ch2 is assumed to be a frequency band ranging from 2400 MHz to 2440 MHz, and BW2 is 40 MHz.

The STA1 may determine that BW1 is less than BW2, indicating that the AP1 has remaining available bandwidth. The STA1 sends the ACK frame to the AP1, and after receiving the ACK frame, the AP1 allocates a frequency band ranging from 2400 MHz to 2420 MHz to the STA1, determines that the remaining bandwidth is a frequency band ranging from 2420 MHz to 2440 MHz, and allocates the frequency band ranging from 2420 MHz to 2440 MHz to the STA2.

The AP1 generates a trigger and sends the trigger to the STA1 and the STA2 by using Ch1 and Ch2, respectively. The STA1 may send uplink data data1 to the AP1 by using the frequency band ranging from 2400 MHz to 2420 MHz, and the STA2 may send uplink data data2 to the AP1 by using the frequency band ranging from 2420 MHz to 2440 MHz, as shown in FIG. 4-2. It can be understood that, after data transmission is complete, the AP1 may send the ACK frame to the STA1 and the STA2, to indicate that transmission is complete.

In another case, after the AP1 receives the RTS frame sent by the STA1, a non-data response indication bit in the CTS frame sent by the AP1 to the STA1 may be set to 1, indicating that the AP1 is to allocate some available channels to the STA1. The STA1 sends the ACK frame to the AP1, and the AP1 allocates a frequency band ranging from 2400 MHz to 2410 MHz to the STA1 after receiving the ACK frame, determines that remaining bandwidth is a frequency band ranging from 2410 MHz to 2440 MHz, and may allocate a frequency band ranging from 2410 MHz to 2420 MHz to the STA2, and allocate a frequency band ranging from 2420 MHz to 2440 MHz to the STA3. It can be learned that the AP in this application may provide a data service to a plurality of STAs. Therefore, data transmission efficiency is improved.

Figure 8:
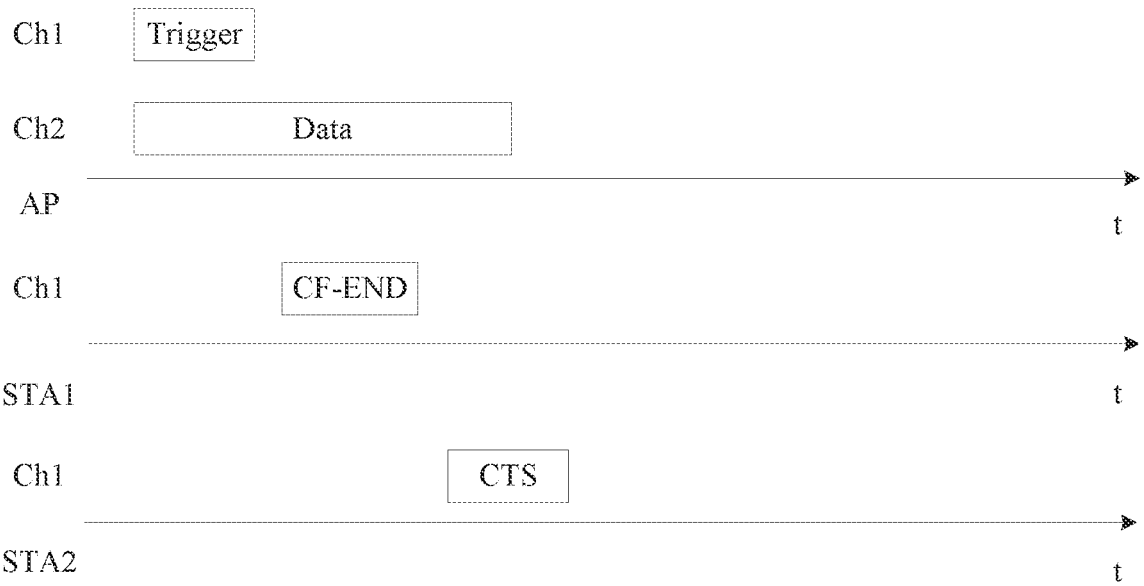
FIG. 8 is another schematic signaling flowchart of a communication method according to the present disclosure.

After the STA1 and the AP1 complete data transmission, the AP1 sends the trigger to the STA1, to instruct the STA1 to release Ch1. After releasing Ch1, the STA1 broadcasts a CF-END frame, and the STA2 or the STA3 may receive the CF-END frame, and set an NAV corresponding to Ch1 to 0. When the STA2 or the STA3 needs to access the AP1, the STA2 may send the CTS frame to the access point, and perform communication with the AP1 by using Ch1, as shown in FIG. 8. The AP2 receives the CF-END frame, and may set the NAV corresponding to Ch1 to 0, and perform communication with the STA3 or the STA4 by using Ch1.

In actual application, a communication process may be initiated by a station or by an access point. The following details a method for initiating a communication process by an access point.

Referring to FIG. 5-1, another embodiment of a communication method according to this application includes the following steps.

501. An access point sends a sending request to a first station. The sending request may include a first bandwidth parameter, and the first bandwidth parameter indicates an available bandwidth of the access point.

In this embodiment, the access point may broadcast the sending request on an available channel, and the sending request may be an RTS frame.

502. The first station sends clear to send information to the access point. The clear to send information may include a second bandwidth parameter, and the second bandwidth parameter is corresponding to bandwidth required by the first station.

Specifically, after the sending request is sensed on a channel, the first station sends the clear to send information to the access point.

503. The access point sends trigger information to the first station.

Specifically, based on the receipt of the clear to send information, the access point confirms that an RTS/CTS frame transmission is successful, accordingly permitting the access point to send a trigger information on the available channel. The trigger information may be a trigger frame.

504. The first station sends uplink data to the access point based on the trigger information.

After the first station sends the uplink data to the access point, the access point may send an ACK frame to the first station, to indicate that data transmission is successful. It should be noted that bandwidth used when the access point and the first station perform communication does not exceed bandwidth corresponding to the second bandwidth parameter.

505. The access point sends the trigger information to a second station.

When the first bandwidth parameter is greater than the second bandwidth parameter, the access point may send the trigger information on a channel set corresponding to remaining bandwidth. The second station may sense the channel set, and perform step 506 when the trigger information is received. It should be noted that step 505 and step 503 may be performed in a same step.

506. The second station sends uplink data to the access point based on the trigger information.

Step 506 is similar to the process of sending the uplink data by the first station to the access point, and details are not described herein again.

For ease of understanding, the following details the communication method according to this embodiment of this application by using a specific application scenario.

In the specific application scenario provided in this application, a BSS includes an AP, a STA1, and a STA2, the sending request is an RTS frame, the first bandwidth parameter is recorded as BW1, a frequency band corresponding to BW1 is a set including Ch1 and Ch2, the clear to send information is a CTS frame, the second bandwidth parameter is recorded as BW2, and a frequency band corresponding to BW2 is Ch1.

The AP1 sends the RTS frame on Ch1 and Ch2. The channel set including Ch1 and Ch2 is assumed to be a frequency band ranging from 2400 MHz to 2440 MHz, and BW1 is 40 MHz.

The STA1 sends the CTS frame to the AP1. Ch2 is assumed to be a frequency band ranging from 2400 MHz to 2420 MHz, and BW2 is 20 MHz.

The AP1 has remaining available bandwidth. The AP1 allocates the frequency band ranging from 2400 MHz to 2420 MHz to the STA1, determines that remaining bandwidth is a frequency band ranging from 2420 MHz to 2440 MHz, and allocates the frequency band ranging from 2420 MHz to 2440 MHz to the STA2.

The AP1 generates a trigger and sends the trigger to the STA1 and the STA2 by using Ch1 and Ch2, respectively. The STA1 may send uplink data data1 to the AP1 by using the frequency band ranging from 2400 MHz to 2420 MHz, and the STA2 may send uplink data data2 to the AP1 by using the frequency band ranging from 2420 MHz to 2440 MHz, as shown in FIG. 5-2. It can be understood that, after data transmission is complete, the AP1 may send an ACK frame respectively to the STA1 and the STA2, to indicate that transmission is successful. It can be learned that the AP in this application may simultaneously provide a data service to a plurality of stations. Therefore, data transmission efficiency is improved.

Figures 3, 4, 5, 6:
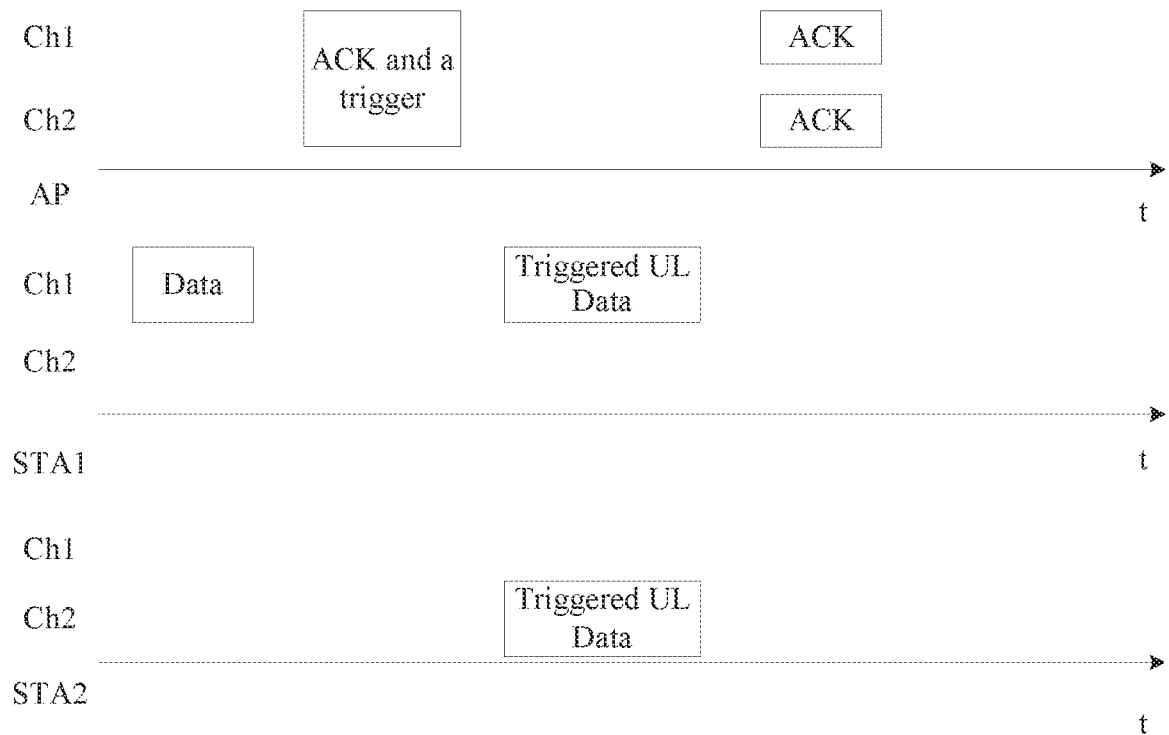
Figures 1, 4:
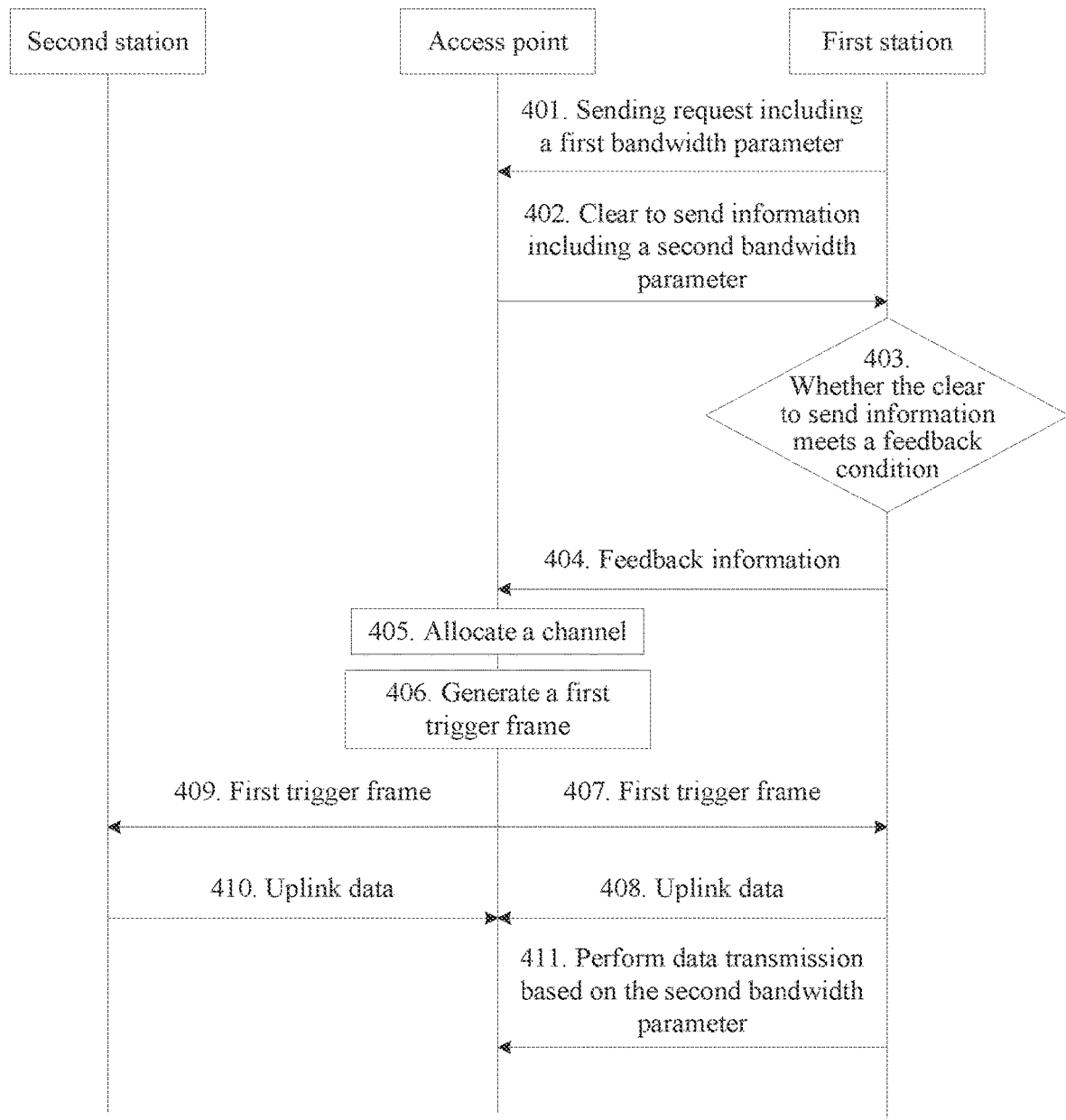
Figures 2, 4:
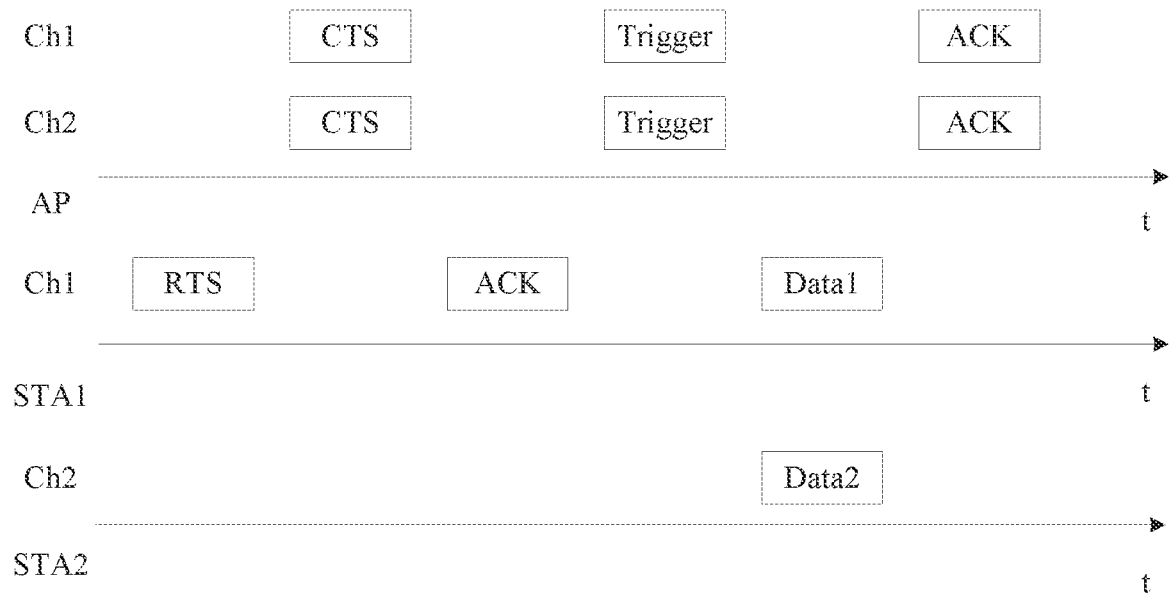
Figures 1, 5:
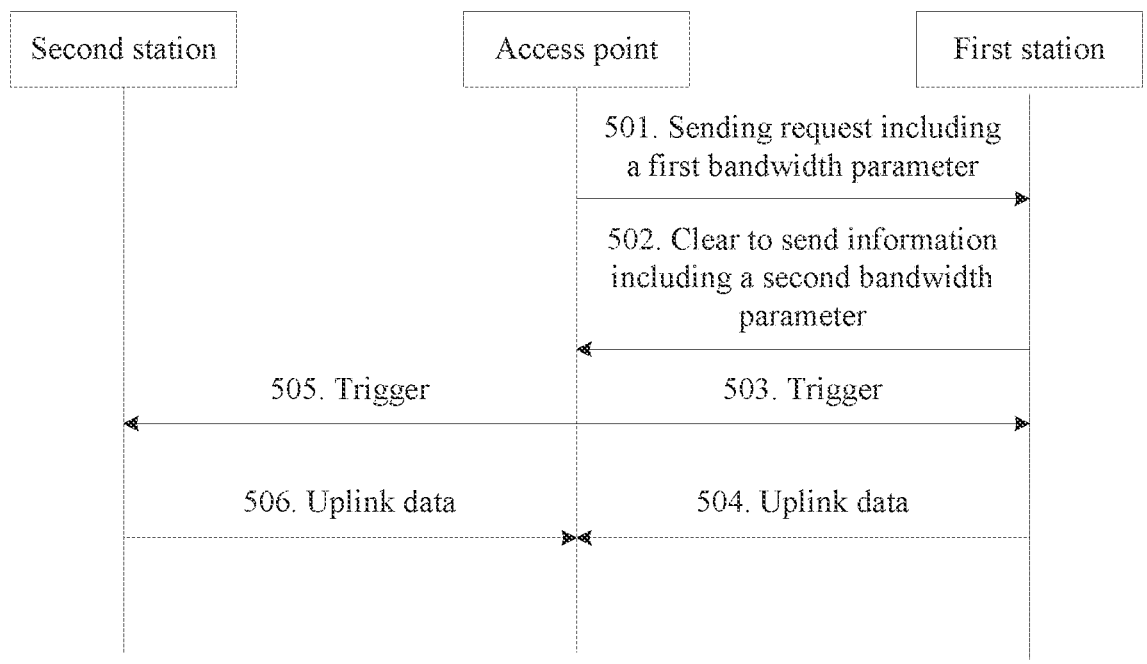
Figures 2, 5:
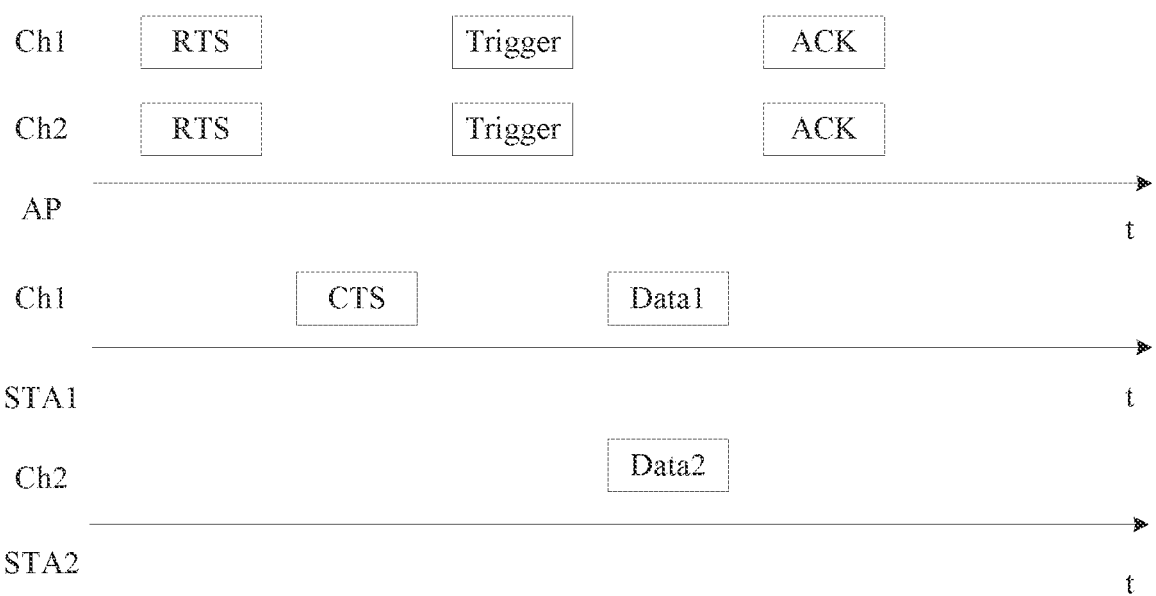
Figures 1, 6:
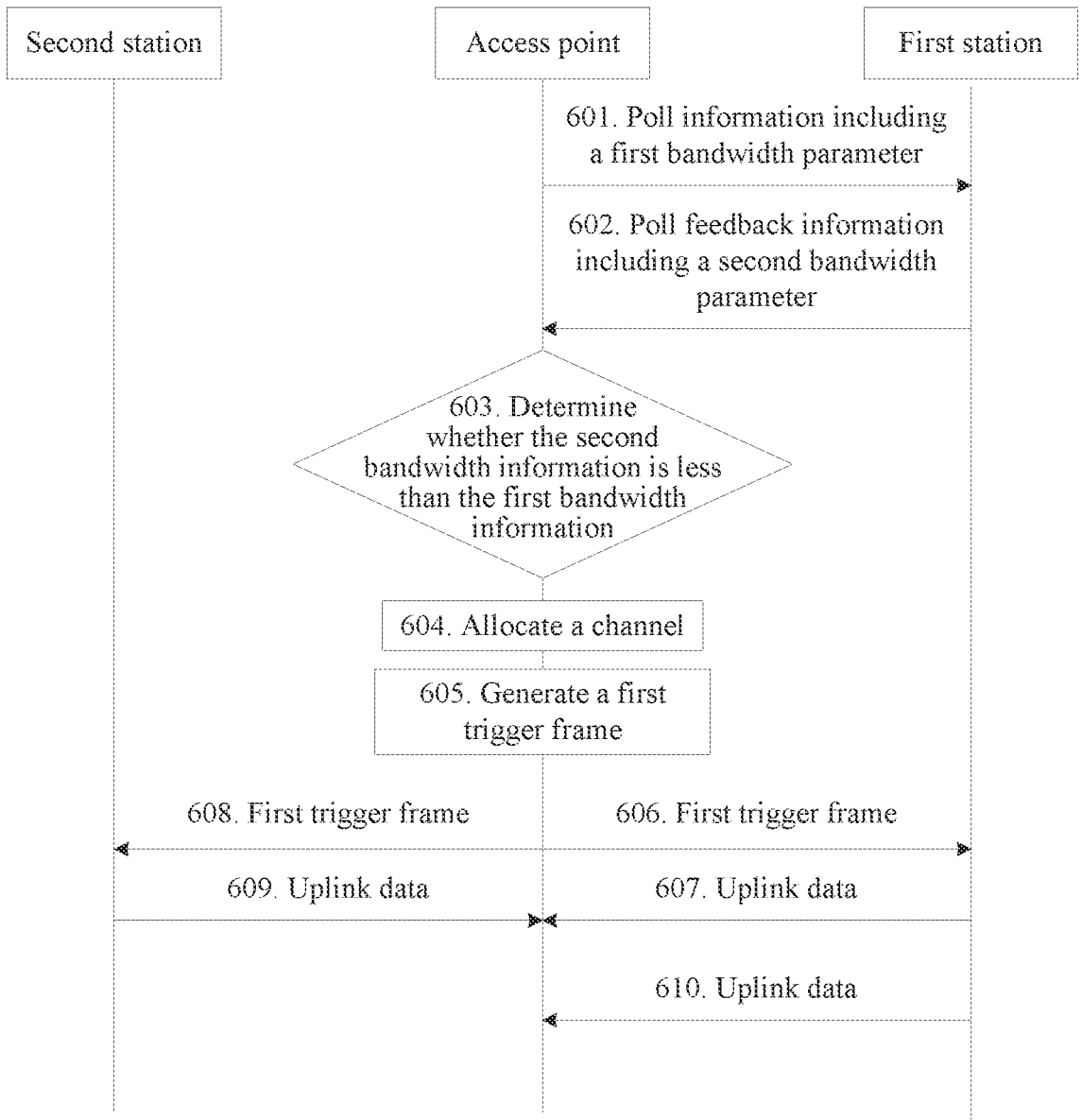
Figures 2, 6:
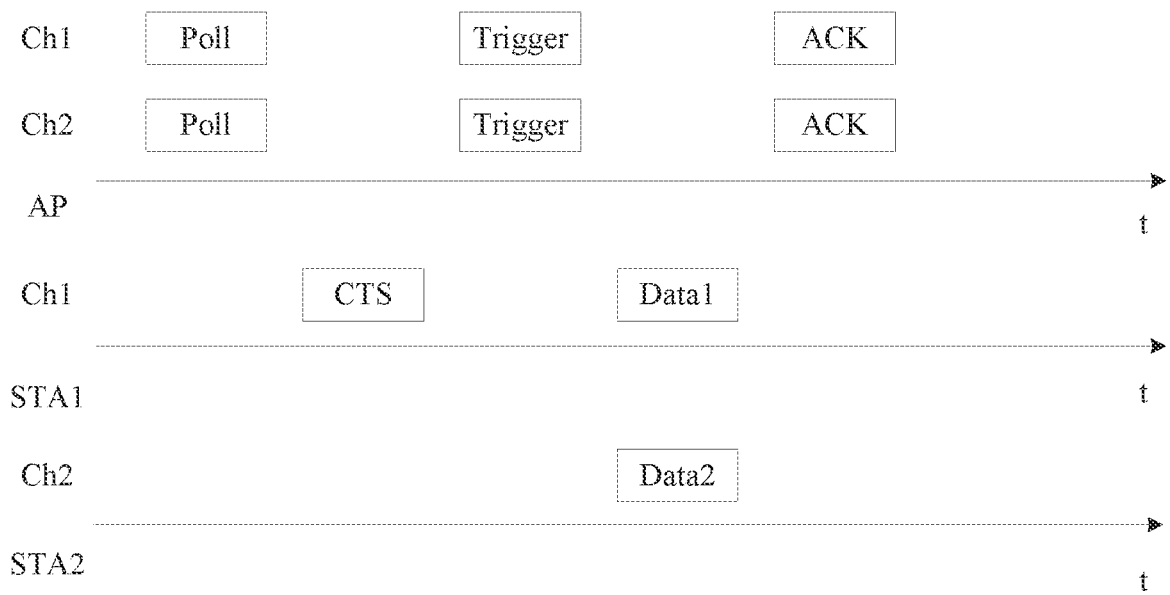

Referring to FIG. 6-1, another embodiment of a communication method according to this application includes the following steps.

601. An access point sends poll information to a first station. The poll information includes a first bandwidth parameter, and the first bandwidth parameter is corresponding to available bandwidth of the access point.

In this embodiment, a basic service set corresponding to the access point includes a plurality of stations, for example, the first station and a second station. The first bandwidth parameter is corresponding to the available bandwidth of the access point. The poll information may be a trigger frame, bandwidth poll, or power save poll (PS-Poll). Likewise, the access point may also send the poll information to the second station or another station. This is similar to sending the poll information to the first station, and details are not described herein again.

602. The first station sends poll feedback information to the access point, where the poll feedback information includes a second bandwidth parameter.

After receiving the poll information, the first station may send the poll feedback information to the access point in response to the poll information, and the access point may receive the poll feedback information sent by the first station. The poll feedback information may be a CTS frame. It should be noted that the first station may start to sense the poll information before step 601 or after step 601.

603. The access point determines whether the second bandwidth parameter is less than the first bandwidth parameter; and if yes, performs step 604; or if no, performs step 610.

When the second bandwidth parameter is less than the first bandwidth parameter, it indicates that the available bandwidth of the access point is greater than bandwidth required by the first station. In addition to performing data transmission with the first station, the access point may perform step 604 to perform data transmission with the other station by using remaining bandwidth. If the first bandwidth parameter is not less than the second bandwidth parameter, step 610 is performed.

604. The access point allocates a channel to the first station based on the second bandwidth parameter, and allocates a channel to a second station based on remaining bandwidth, where the remaining bandwidth is bandwidth in the available bandwidth of the access point except bandwidth required by the first station.

605. The access point generates a first trigger frame.

After allocating the channels to the first station and the second station, the access point may generate the first trigger frame.

606. The access point sends the first trigger frame to the first station.

607. The first station sends uplink data to the access point based on the first trigger frame.

After receiving the first trigger frame, the first station sends the uplink data to the access point based on the first trigger frame, and the access point may receive the uplink data sent by the first station.

608. The access point sends the first trigger frame to the second station.

609. The second station sends uplink data to the access point.

After receiving the first trigger frame, the second station sends the uplink data to the access point based on the first trigger frame, and the access point may receive the uplink data sent by the second station.

610. The first station sends uplink data to the access point based on the first bandwidth parameter.

When the first bandwidth parameter is less than the second bandwidth parameter, the access point sends the first trigger frame to the first station based on the first bandwidth parameter, the first station sends the uplink data to the access point based on the first bandwidth parameter, and the access point may receive the uplink data.

Optionally, after the first station and the access point complete data transmission, the method further includes: sending, by the access point, a second trigger frame to the first station, where the second trigger frame is used to instruct the first station to release the channel.

After receiving the second trigger frame sent by the access point, the first station may release the channel based on the second trigger frame and broadcast a resource release indication. The resource release indication is used to instruct an adjacent node of the first station to reset a network allocation vector. The second trigger frame may be a trigger frame, and the resource release indication may be a CF-END frame.

For ease of understanding, the following details the communication method according to this application by using a specific application scenario.

In the specific application scenario provided in this application, a BSS1 includes an AP1, a STA1, and a STA2, and a BSS2 includes an AP2, the STA1, a STA3, and a STA4, as shown in FIG. 7. The sending request is an RTS frame, the first bandwidth parameter is recorded as BW1, a frequency band corresponding to BW1 is a set including Ch1 and Ch2, the clear to send information is a CTS frame, the second bandwidth parameter is recorded as BW2, a frequency band corresponding to BW2 is Ch1, and the feedback information is assumed to be an ACK frame.

The AP1 sends a poll frame on Ch1 and Ch2. The channel set including Ch1 and Ch2 is assumed to be a frequency band ranging from 2400 MHz to 2440 MHz, and BW1 is 40 MHz.

The STA1 sends the CTS frame to the AP1. Ch2 is assumed to be a frequency band ranging from 2400 MHz to 2420 MHz, and BW2 is 20 MHz.

The AP1 may determine that BW2 is less than BW1, that is, the AP1 has remaining available bandwidth. The AP1 allocates the frequency band ranging from 2400 MHz to 2420 MHz to the STA1, determines that the remaining bandwidth is a frequency band ranging from 2420 MHz to 2440 MHz, and allocates the frequency band ranging from 2420 MHz to 2440 MHz to the STA2.

The AP1 generates a trigger and sends the trigger to the STA1 and the STA2 by using Ch1 and Ch2, respectively. The STA1 may send uplink data data1 to the AP1 by using the frequency band ranging from 2400 MHz to 2420 MHz, and the STA2 may send uplink data data2 to the AP1 by using the frequency band ranging from 2420 MHz to 2440 MHz, as shown in FIG. 6-2. It can be understood that, after data transmission is complete, the AP1 may send the ACK frame to the STA1 and the STA2, to indicate that transmission is successful. It can be learned that the AP in this application may simultaneously provide a data service to the plurality of stations. Therefore, data transmission efficiency is improved.

After the STA1 and the AP1 complete data transmission, the AP1 sends the trigger to the STA1, to instruct the STA1 to release Ch1. After releasing Ch1, the STA1 broadcasts a CF-END frame, and the STA2 or the STA3 may receive the CF-END frame, and set an NAV corresponding to Ch1 to 0. When the STA2 or the STA3 needs to access the AP1, the STA2 may send the CTS frame to the access point, and perform communication with the AP1 by using Ch1, as shown in FIG. 8. The AP2 receives the CF-END frame, and may set an NAV to 0, and perform communication with the STA3 or the STA4 by using Ch1.

The foregoing describes the communication method in this application from a method perspective, while the following describes a network device in this application from an apparatus perspective.

Figures 1, 9:
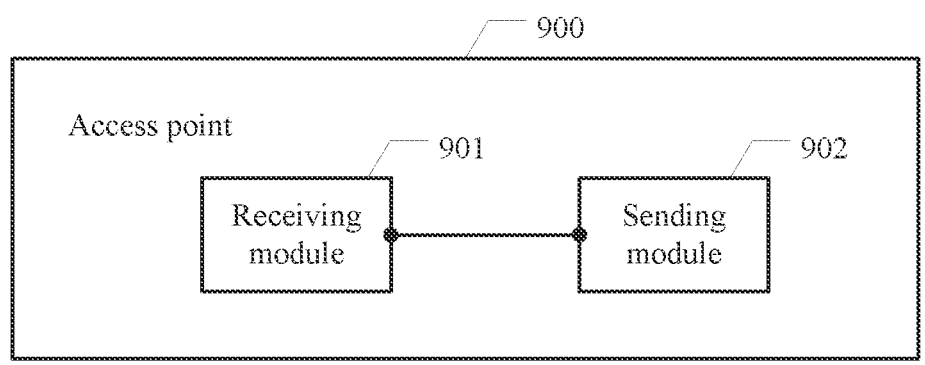
Figures 2, 9:
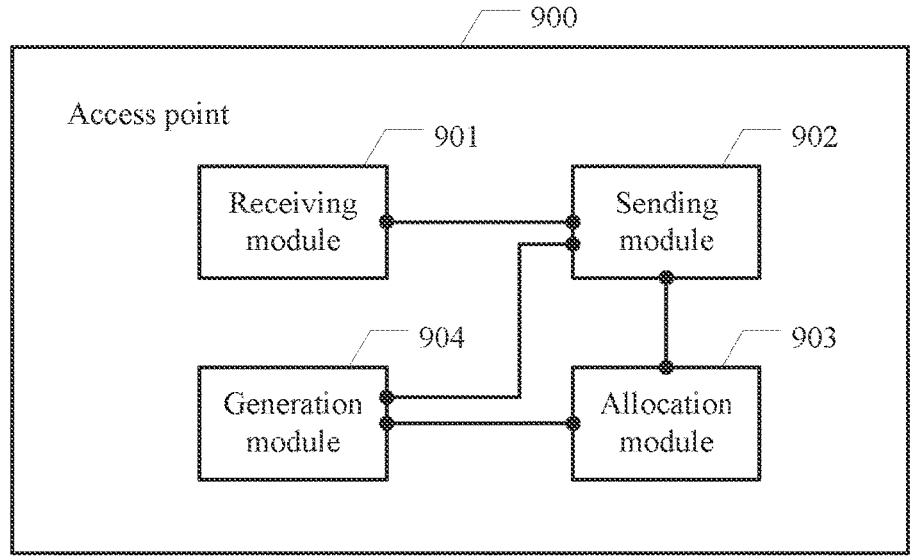
Figures 3, 9:
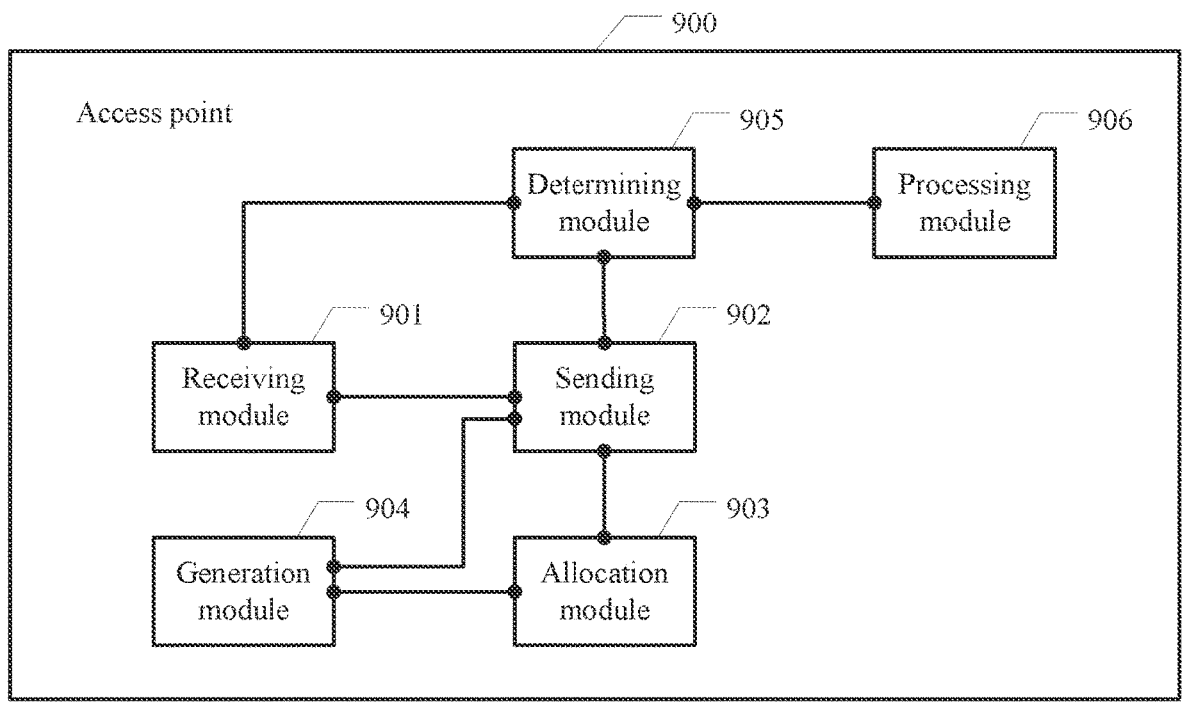

Referring to FIG. 9-1, this application provides an access point 900, including:
    a receiving module 901, configured to receive a sending request sent by a first station, where the sending request includes a first bandwidth parameter, and the first bandwidth parameter is corresponding to bandwidth required by the first station; and
    a sending module 902, configured to send clear to send information to the first station and a second station, where the clear to send information includes a second bandwidth parameter, and the second bandwidth parameter is corresponding to available bandwidth of the access point, where
    the receiving module 901 is further configured to receive uplink transmission data sent by the first station; and
    the receiving module 901 is further configured to receive uplink transmission data sent by the second station.

Optionally, in some embodiments of this application,
    the receiving module 901 is further configured to: after the sending module 902 sends the clear to send information to the first station, receive feedback information sent by the first station;
    the sending module 902 is further configured to: after the receiving module 901 receives the feedback information, send trigger information to the first station, to trigger the first station to send uplink data to the access point; and
    the sending module 902 is further configured to: after the receiving module 901 receives the feedback information, send trigger information to the second station, to trigger the second station to send uplink data to the access point.

Based on the previous embodiment, in some embodiments of this application, the feedback information is a data packet, an ACK frame, a CTS frame, a channel state report frame, a control frame, or a management frame, and the trigger information includes a trigger frame and an ACK frame.

Optionally, in some embodiments of this application, the feedback information is a data packet, an ACK frame, a CTS frame, a channel state report frame, a control frame, or a management frame, and the trigger information is a trigger frame.

Optionally, in other embodiments of this application, referring to FIG. 9-2, this application provides an access point 900, including:
    a receiving module 901, configured to receive a sending request sent by a first station, where the sending request includes a first bandwidth parameter, and the first bandwidth parameter is corresponding to bandwidth required by the first station;
    a sending module 902, configured to send clear to send information to the first station, where the clear to send information includes a second bandwidth parameter, and the second bandwidth parameter is corresponding to available bandwidth of the access point;
    an allocation module 903, configured to: when the access point receives feedback information sent by the first station, allocate a channel to the first station, and allocate a channel to a second station based on remaining bandwidth, where the remaining bandwidth is bandwidth in the available bandwidth of the access point except the bandwidth allocated to the first station; and a generation module 904, configured to generate a first trigger frame, where the sending module 902 is further configured to send the first trigger frame to the first station and the second station; and the receiving module 901 is further configured to receive uplink data sent by the first station and the second station.

In some embodiments of this application, the allocation module 903 may randomly select a channel from a channel set corresponding to the remaining bandwidth, and allocate the channel to the second station; or select, based on a random access request sent by the second station, a channel from a channel set corresponding to the remaining bandwidth, and allocate the channel to the second station; or select, based on upload requirement information sent by the second station, a channel from a channel set corresponding to the remaining bandwidth, and allocate the channel to the second station.

In other embodiments of this application, the allocation module 903 may allocate all or some channels in a channel set corresponding to the first bandwidth parameter to the first station.

In other embodiments of this application, when the clear to send information further includes a control transfer identifier, the allocation module 903 may allocate some channels in a channel set corresponding to the second bandwidth parameter to the first station.

Referring to FIG. 9-3, in some embodiments of this application, the access point 900 further includes:

a determining module 905, configured to determine whether the bandwidth required by the first station includes an available channel set that includes a control channel; and if yes, trigger the sending module 902 to perform the step of sending, by the access point, clear to send information to the first station; or if no, trigger a processing module 906 to prohibit sending the clear to send information to the first station.

In some embodiments of this application, the feedback information is an acknowledgment ACK frame, a clear to send CTS frame, or a channel state report frame.

In some embodiments of this application, when the feedback information sent by the first station is not received, the sending module 902 may receive, based on the second bandwidth parameter, the uplink data sent by the first station.

Figures 1, 10:
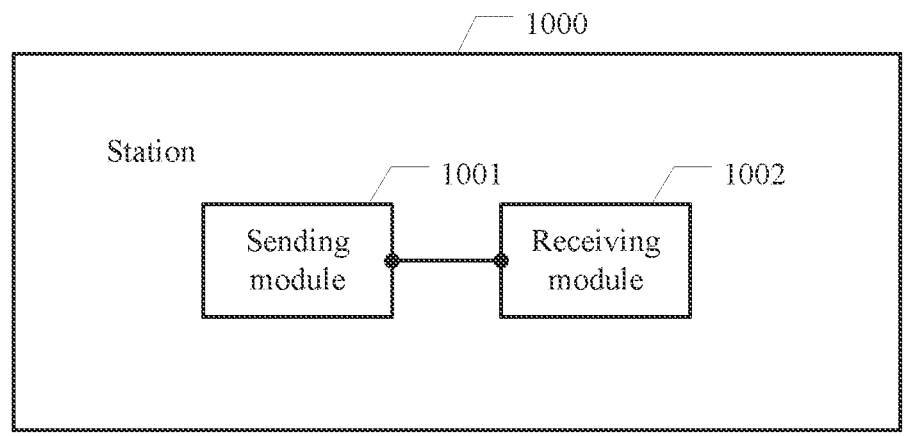
Figures 2, 10:
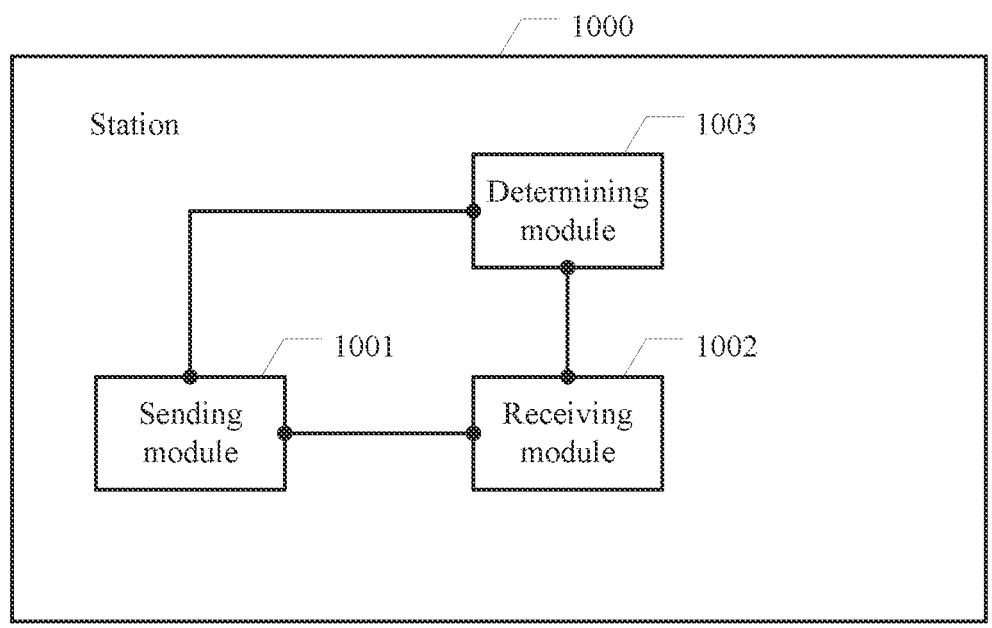

Referring to FIG. 10-1, this application provides a station 1000. The station serves as a first station, and the station includes:

a sending module 1001, configured to broadcast a sending request, where the sending request includes a first bandwidth parameter, and the first bandwidth parameter is corresponding to bandwidth required by the first station; and a receiving module 1002, configured to receive clear to send information sent by an access point, where the clear to send information includes a second bandwidth parameter, and the second bandwidth parameter is corresponding to available bandwidth of the access point, where the sending module 1001 is further configured to send uplink data to the access point.

Optionally, in some embodiments of this application, the sending module 1001 is further configured to send feedback information to the access point after the receiving module 1002 receives the clear to send information sent by the access point; and the receiving module 1002 is further configured to: after the sending module 1001 sends the feedback information to the access point, receive trigger information sent by the access point, to trigger the sending module 1001 to send uplink data to the access point.

Based on the previous embodiment, in some embodiments of this application, the feedback information is a data packet, and the trigger information includes a trigger frame and an ACK frame.

Optionally, in some embodiments of this application, referring to FIG. 10-1, this application provides a station 1000. The station serves as a first station, and the station includes:

a sending module 1001, configured to broadcast a sending request, where the sending request includes a first bandwidth parameter, and the first bandwidth parameter is corresponding to bandwidth required by the first station; and a receiving module 1002, configured to receive clear to send information sent by an access point, where the clear to send information includes a second bandwidth parameter, and the second bandwidth parameter is corresponding to available bandwidth of the access point, where the sending module 1001 is further configured to broadcast feedback information if the clear to send information meets a feedback condition;

the receiving module 1002 is further configured to receive a first trigger frame sent by the access point; and the sending module 1001 is configured to send uplink data to the access point based on the first trigger frame.

Referring to FIG. 10-2, in some embodiments of this application, the station 1000 further includes a determining module 1003, where the determining module 1003 is configured to: determine whether the first bandwidth parameter is less than the second bandwidth parameter, and if yes, determine that the clear to send information meets the feedback condition; or configured to: determine whether a first channel set is a proper subset of a second channel set, and if yes, determine that the clear to send information meets the feedback condition, where the first channel set is corresponding to the first bandwidth parameter, and the second channel set is corresponding to the second bandwidth parameter; or configured to: determine whether a first channel set and a second channel set include a same channel, and if yes, determine that the clear to send information meets the feedback condition; or configured to: determine whether the clear to send information includes a control transfer identifier, and if the clear to send information includes the control transfer identifier, determine that the clear to send information meets the feedback condition.

In some embodiments of this application, if the clear to send information does not meet the feedback condition, the sending module 1001 may send uplink data to the access point based on the second bandwidth parameter.

Figure 11:
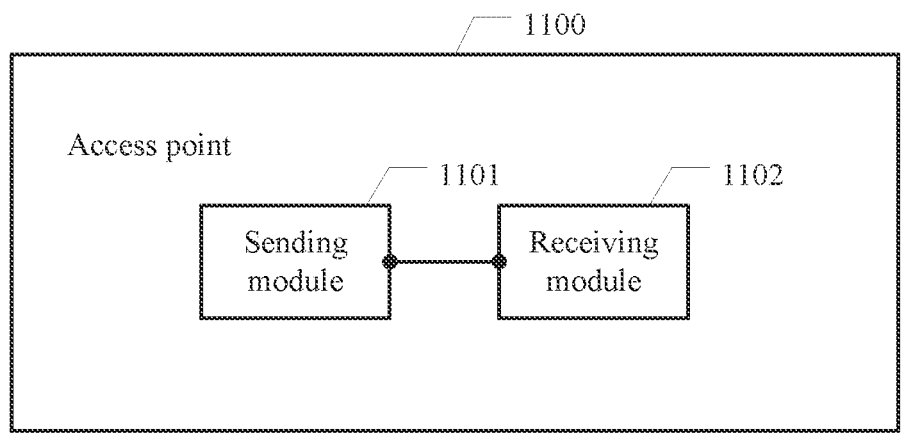
FIG. 11 is a schematic diagram of an access point according to the present disclosure.

Referring to FIG. 11, this application provides an access point 1100, including:

a sending module 1101, configured to send a sending request to a first station, where the sending request includes a first bandwidth parameter, and the first bandwidth parameter is corresponding to available bandwidth of the access point; and a receiving module 1102, configured to receive clear to send information sent by the first station, where the clear to send information includes a second bandwidth parameter, and the second bandwidth parameter is corresponding to bandwidth required by the first station, where the sending module 1101 is further configured to send trigger information to the first station; and the receiving module 1102 is further configured to receive uplink data sent by the first station.

Figure 12:
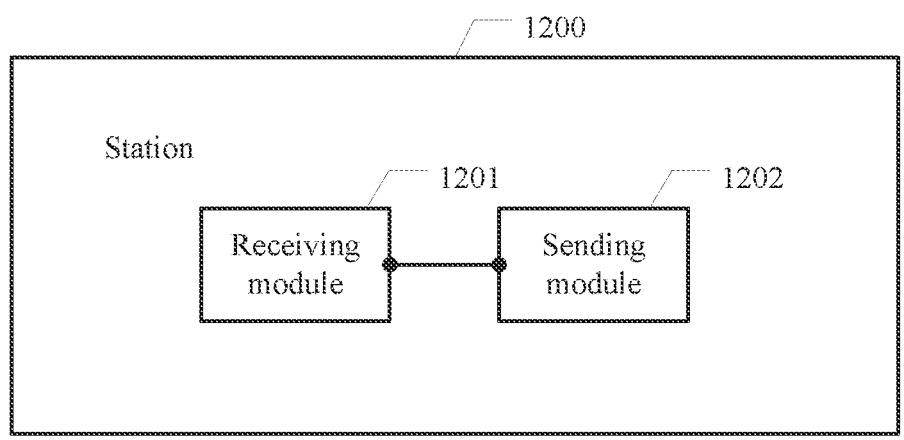
FIG. 12 is another schematic diagram of a station according to the present disclosure.

Referring to FIG. 12, this application provides a station 1200, including:

a receiving module 1201, configured to receive a sending request sent by an access point, where the sending request includes a first bandwidth parameter, and the first bandwidth parameter is corresponding to available bandwidth of the access point; and a sending module 1202, configured to send clear to send information to the access point after the receiving module 1201 receives the sending request, where the clear to send information includes a second bandwidth parameter, and the second bandwidth parameter is corresponding to bandwidth required by a first station, where the receiving module 1201 is configured to receive trigger information sent by the access point; and the sending module 1202 is configured to send uplink data to the access point after the receiving module 1201 receives the trigger information.

Figure 13:
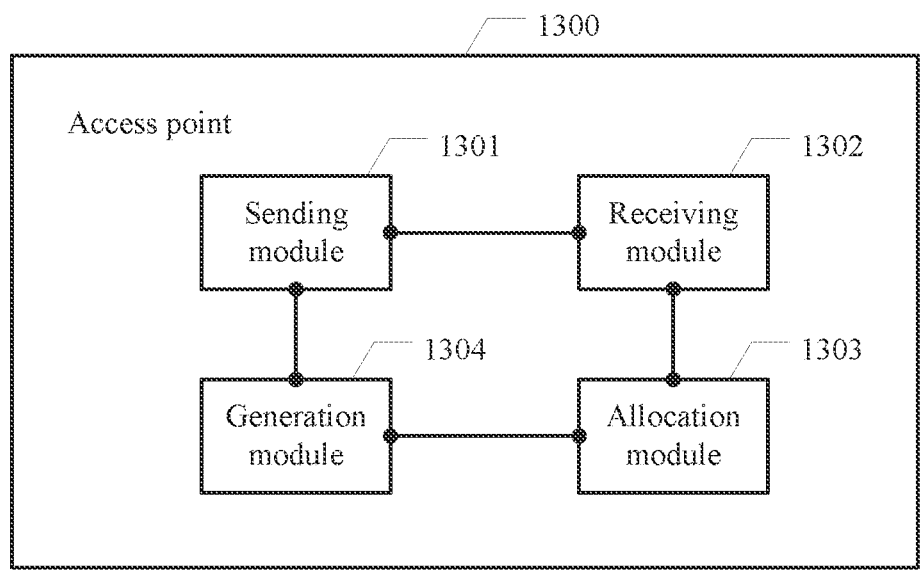
FIG. 13 is another schematic diagram of an access point according to the present disclosure.

Referring to FIG. 13, this application provides an access point 1300, including:

a sending module 1301, configured to send poll information to a first station, where the poll information includes a first bandwidth parameter, and the first bandwidth parameter is corresponding to available bandwidth of the access point;

a receiving module 1302, configured to receive poll feedback information sent by the first station, where the poll feedback information includes a second bandwidth parameter, and the second bandwidth parameter is corresponding to bandwidth required by the first station;

an allocation module 1303, configured to: if the first bandwidth parameter is greater than the second bandwidth parameter, allocate a channel to the first station based on the second bandwidth parameter, and allocate a channel to a second station based on remaining bandwidth, where the remaining bandwidth is bandwidth in the available bandwidth of the access point except the bandwidth allocated to the first station; and a generation module 1304, configured to generate a first trigger frame, where the sending module 1301 is further configured to send the first trigger frame to the first station and the second station; and the receiving module 1302 is further configured to receive uplink data sent by the first station and the second station.

Figure 14:
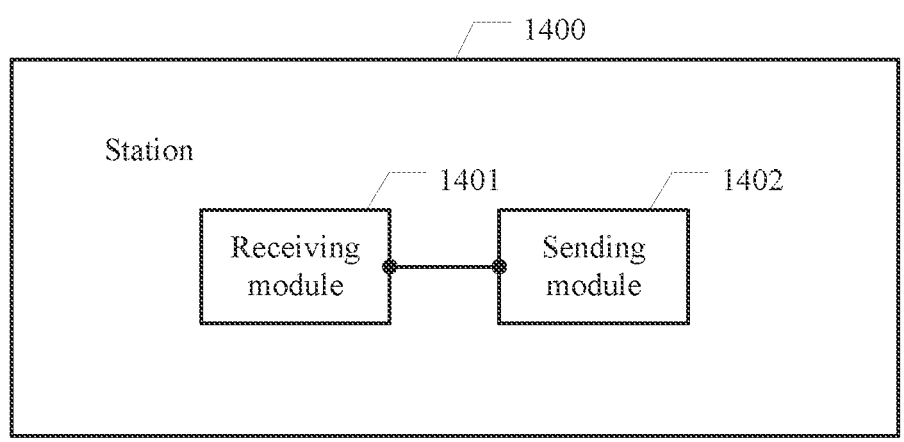
FIG. 14 is another schematic diagram of a station according to the present disclosure.

Referring to FIG. 14, this application provides a station 1400. The station serves as a first station, and the station 1400 includes:

a receiving module 1401, configured to receive poll information sent by an access point, where the poll information includes a first bandwidth parameter, and the first bandwidth parameter is corresponding to available bandwidth of the access point; and a sending module 1402, configured to send poll feedback information to the access point, where the poll feedback information includes a second bandwidth parameter, and the second bandwidth parameter is corresponding to bandwidth required by the first station, where the receiving module 1401 is further configured to receive a first trigger frame sent by the access point; and the sending module 1402 is further configured to send uplink data to the access point based on the first trigger frame.

Figure 15:
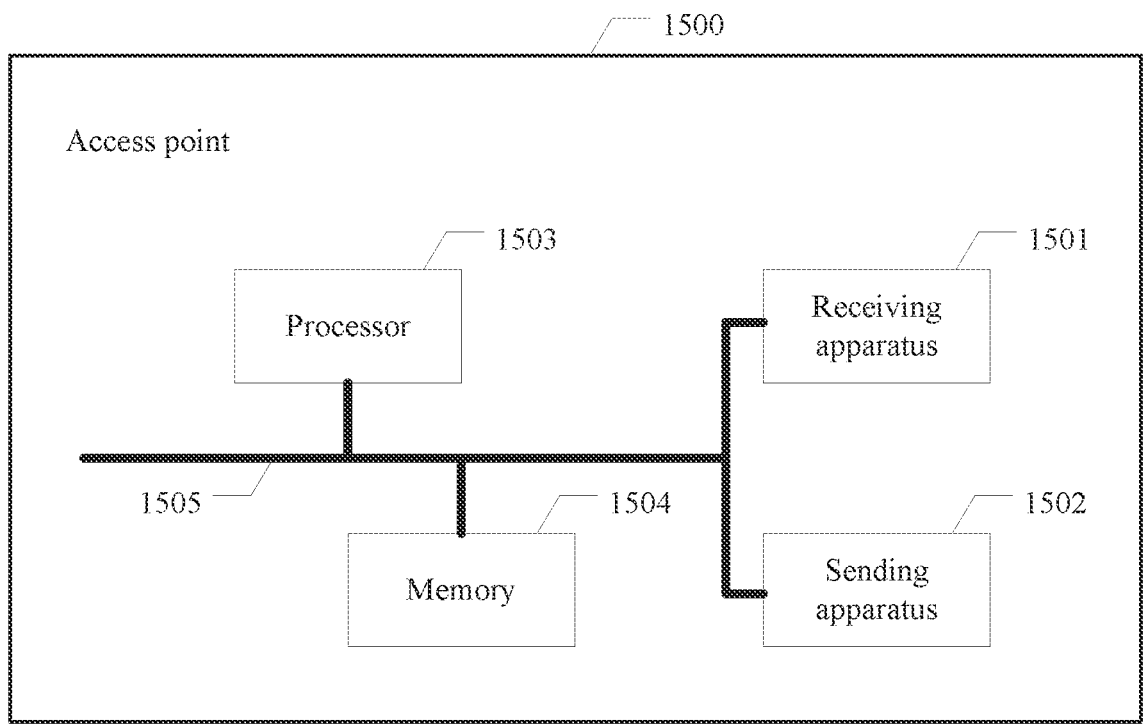
FIG. 15 is a schematic structural diagram of an access point according to the present disclosure.

The foregoing describes the network node according to this application from a functional module perspective, and the following describes a network node according to this application from a hardware perspective. Referring to FIG. 15, this application provides an access point, including a receiving apparatus 1501, a sending apparatus 1502, a processor 1503, a memory 1504, and a bus 1505. The receiving apparatus 1501, the sending apparatus 1502, the processor 1503, and the memory 1504 are connected and communicate with each other by using the bus 1505, and the processor 1503 is configured to perform the following method by invoking an operation instruction stored in the memory 1504:

controlling the receiving apparatus to receive a sending request sent by a first station, where the sending request includes a first bandwidth parameter, and the first bandwidth parameter is corresponding to bandwidth required by the first station;

controlling the sending apparatus to send clear to send information to the first station, where the clear to send information includes a second bandwidth parameter, and the second bandwidth parameter is corresponding to available bandwidth of the access point;

when the access point receives feedback information sent by the first station, allocating a channel to the first station, and allocating a channel to a second station based on remaining bandwidth, where the remaining bandwidth is bandwidth in the available bandwidth of the access point except the bandwidth allocated to the first station;

generating a first trigger frame;

controlling the sending apparatus to send the first trigger frame to the first station and the second station; and controlling the receiving apparatus to receive uplink data sent by the first station and the second station.

In some embodiments of this application, the processor 1503 may be specifically configured to randomly select a channel from a channel set corresponding to the remaining bandwidth, and allocate the channel to the second station; or specifically configured to select, based on a random access request sent by the second station, a channel from a channel set corresponding to the remaining bandwidth, and allocate the channel to the second station; or specifically configured to select, based on upload requirement information sent by the second station, a channel from a channel set corresponding to the remaining bandwidth, and allocate the channel to the second station.

In some embodiments of the present disclosure, the processor 1503 may be specifically configured to allocate all or some channels in a channel set corresponding to the first bandwidth parameter to the first station.

In some embodiments of the present disclosure, when the clear to send information further includes a control transfer identifier, the processor 1503 may be specifically configured to allocate some channels in a channel set corresponding to the second bandwidth parameter to the first station.

In some embodiments of the present disclosure, the processor 1503 is further configured to: determine whether the bandwidth required by the first station includes an available channel set that includes a control channel; and if yes, control the sending apparatus 1502 to perform the step of sending, by the access point, clear to send information to the first station; or if no, prohibit sending the clear to send information to the first station.

In some embodiments of the present disclosure, the feedback information is an acknowledgment ACK frame, a clear to send CTS frame, or a channel state report frame.

In some embodiments of the present disclosure, when the feedback information sent by the first station is not received by the access point, under control of the processor 1503, the receiving apparatus 1501 is further configured to receive, based on the second bandwidth parameter, the uplink data sent by the first station.

In some embodiments of the present disclosure, after the first station and the access point complete data transmission, under control of the processor 1503, the sending module 1502 sends a second trigger frame to the first station, where the second trigger frame is used to instruct the first station to release the channel.

Figure 16:
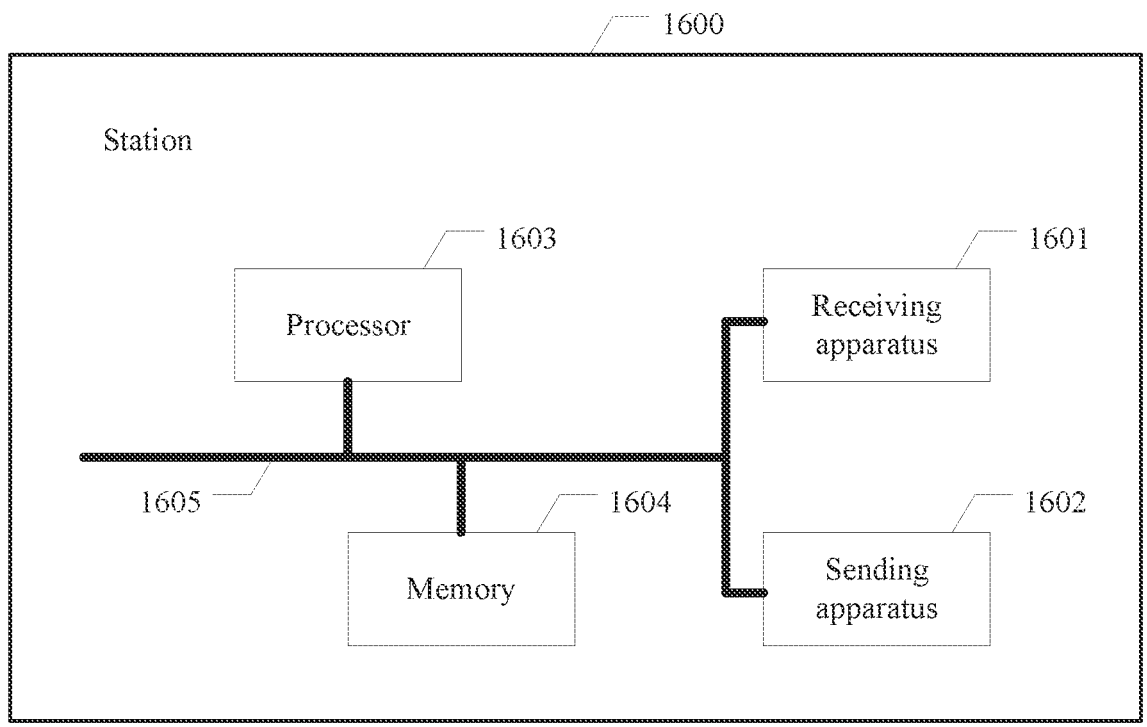
FIG. 16 is a schematic structural diagram of a station according to the present disclosure.

Referring to FIG. 16, this application provides a station, including:
- a receiving apparatus 1601, a sending apparatus 1602, a processor 1603, a memory 1604, and a bus 1605, where the receiving apparatus 1601, the sending apparatus 1602, the processor 1603, and the memory 1604 are connected and communicate with each other by using the bus 1605, and the processor 1603 is configured to perform the following method by invoking an operation instruction stored in the memory 1604:
- controlling the sending apparatus to broadcast a sending request, where the sending request includes a first bandwidth parameter, and the first bandwidth parameter is corresponding to bandwidth required by the first station;
- controlling the receiving module to receive clear to send information sent by an access point, where the clear to send information includes a second bandwidth parameter, and the second bandwidth parameter is corresponding to available bandwidth of the access point;
- if the clear to send information meets a feedback condition, controlling the sending apparatus to broadcast feedback information;
- controlling the receiving apparatus to receive a first trigger frame sent by the access point; and
- controlling the sending apparatus to send uplink data to the access point based on the first trigger frame.

In some embodiments of the present disclosure, the processor 1603 may determine whether the first bandwidth parameter is less than the second bandwidth parameter, and if yes,
- determine that the clear to send information meets the feedback condition; or determine whether a first channel set is a proper subset of a second channel set, and if yes, determine that the clear to send information meets the feedback condition, where the first channel set is corresponding to the first bandwidth parameter, and the second channel set is corresponding to the second bandwidth parameter; or
- determine whether a first channel set and a second channel set include a same channel, and if yes, determine that the clear to send information meets the feedback condition; or
- determine whether the clear to send information includes a control transfer identifier, and if the clear to send information includes the control transfer identifier, determine that the clear to send information meets the feedback condition.

In some embodiments of the present disclosure, If the clear to send information does not meet the feedback condition, under control of the processor 1603, the sending apparatus 1602 sends uplink data to the access point based on the second bandwidth parameter.

In some embodiments of the present disclosure, under control of the processor 1603, the receiving apparatus 1601 receives a second trigger frame sent by the access point, where the second trigger frame is used to instruct the first station to release a channel.

In some embodiments of the present disclosure, under control of the processor 1603, the sending apparatus 1601 may broadcast a resource release indication based on the second trigger frame, where the resource release indication is used to instruct an adjacent node of the first station to reset a network allocation vector.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A communication method comprising:
   broadcasting, by an access point, a sending request to a first station, wherein the sending request comprises a first bandwidth parameter, the first bandwidth parameter indicates an available bandwidth of the access point;
   receiving, by the access point, a clear to send information from the first station in response to the sending request, wherein the clear to send information comprises a second bandwidth parameter, the second bandwidth parameter corresponds to a bandwidth required by the first station;
   allocating, by the access point in response to the available bandwidth being greater than the required bandwidth, the required bandwidth to the first station and remaining bandwidth in the available bandwidth to a second station;
   sending, by the access point, trigger information to the first station on the required bandwidth; and
   sending, by the access point, the trigger information to the second station on the remaining bandwidth,
   wherein sending the trigger information to the first station on the required bandwidth and sending the trigger information to the second station on the remaining bandwidth are performed simultaneously.

2. The method according to claim 1, wherein the sending request is a request to send (RTS) frame, the clear to send information is a clear to send (CTS) frame, and the trigger information is a trigger frame.

3. The method according to claim 2, further comprising:
   confirming, by the access point, that the RTS/CTS frame transmission is successful based on the receipt of the clear to send information.

4. The method according to claim 3, further comprising:
   receiving, by the access point, uplink data based on the trigger information.

5. The method according to claim 1, further comprising:
   receiving, by the access point, based on the trigger information, uplink data from the first station and the second station.

6. A communication apparatus comprising:
   a processor and;
   a memory for storing instructions which, when executed by the processor, cause the communication apparatus to:
   broadcast a sending request to a first station, wherein the sending request comprises a first bandwidth parameter, the first bandwidth parameter indicates an available bandwidth of the communication apparatus;
   receive a clear to send information from the first station in response to the sending request, wherein the clear to send information comprises a second bandwidth parameter, the second bandwidth parameter corresponds to a bandwidth required by the first station;
   allocate, in response to the available bandwidth being greater than the required bandwidth, the required bandwidth to the first station and remaining bandwidth in the available bandwidth to a second station;
   send trigger information to the first station on the required bandwidth; and
   send the trigger information to the second station on the remaining bandwidth,
   wherein sending the trigger information to the first station on the required bandwidth and sending the trigger information to the second station on the remaining bandwidth are performed simultaneously.

7. The apparatus according to claim 6, wherein the sending request is a broadcast request to send (RTS) frame, the clear to send information is a clear to send (CTS) frame, and the trigger information is a trigger frame.

8. The apparatus according to claim 7, wherein the instructions stored in the memory, upon execution by the processor, further cause the communication apparatus to:
   confirm that the RTS/CTS frame transmission is successful based on the receipt of the clear to send information.

9. The apparatus according to claim 7, wherein the instructions stored in the memory, upon execution by the processor, further cause the communication apparatus to:
   receive uplink data based on the trigger information.

10. The apparatus according to claim 6, wherein the instructions stored in the memory, upon execution by the processor, further cause the communication apparatus to:
    receive based on the trigger information, uplink data from the first station and the second station.

11. A non-transitory computer readable storage medium, comprising computer-executable instructions which, when executed by a processor of a communication apparatus, cause the communication apparatus to:
    broadcast a sending request to a first station, wherein the sending request comprises a first bandwidth parameter, the first bandwidth parameter indicates an available bandwidth of the communication apparatus;
    receive a clear to send information from the first station in response to the sending request, wherein the clear to send information comprises a second bandwidth parameter, the second bandwidth parameter is corresponding to a bandwidth required by the first station;
    allocate, in response that the available bandwidth is greater than the required bandwidth, the required bandwidth to the first station and remaining bandwidth in the available bandwidth to a second station;
    send trigger information to the first station on the required bandwidth; and
    send the trigger information to the second station on the remaining bandwidth,
    wherein sending the trigger information to the first station on the required bandwidth and sending the trigger information to the second station on the remaining bandwidth are performed simultaneously.

12. The non-transitory computer readable storage medium according to claim 11, wherein the sending request is a broadcast request to send (RTS) frame, the clear to send information is a clear to send (CTS) frame, and the trigger information is a trigger frame.

13. The non-transitory computer readable storage medium according to claim 12, wherein the instructions stored in the memory, upon execution by the processor, further cause the communication apparatus to:
   confirm that the RTS/CTS frame transmission is successful based on the receipt of the clear to send information.

14. The non-transitory computer readable storage medium according to claim 12, wherein the instructions stored in the memory, upon execution by the processor, further cause the communication apparatus to:
   receive uplink data based on the trigger information.

15. The non-transitory computer readable storage medium according to claim 11, wherein the instructions stored in the memory, upon execution by the processor, further cause the communication apparatus to:
   receive based on the trigger information, uplink data from the first station and the second station.

* * * * *